US008672762B1

(12) United States Patent
Basallo et al.

(10) Patent No.: US 8,672,762 B1

(45) Date of Patent: Mar. 18, 2014

(54) GAMING SYSTEM AND METHOD PROVIDING A SELECTION GAME ASSOCIATED WITH SELECTABLE VISUALLY UNBLOCKED OBJECTS AND UNSELECTABLE VISUALLY BLOCKED OBJECTS

(71) Applicant: IGT, Reno, NV (US)

(72) Inventors: Leandro Basallo, San Francisco, CA (US); Scott A. Caputo, Santa Clara, CA (US); Thomas A. Uster, San Francsico, CA (US); Bryan D. Wolf, Reno, NV (US); Christmas C. Parker, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 13/626,380

(22) Filed: Sep. 25, 2012

(51) Int. Cl.
*G06F 17/00* (2006.01)

(52) U.S. Cl.
USPC ............................................................ 463/37

(58) Field of Classification Search
USPC .................................... 463/16–25, 33, 35–37
See application file for complete search history.

(56) References Cited

U.S. PATENT DOCUMENTS

| | | | |
|---|---|---|---|
| 4,003,578 | A | 1/1977 | Jones et al. |
| 4,103,895 | A | 8/1978 | Pressman et al. |
| 4,182,515 | A | 1/1980 | Nemeth |
| 4,277,067 | A | 7/1981 | Gettleman et al. |
| 4,323,242 | A | 4/1982 | Rosenfeld |
| 4,511,143 | A | 4/1985 | Sankrithi |
| 4,850,592 | A | 7/1989 | Winter et al. |
| 5,083,800 | A | 1/1992 | Lockton |
| 5,178,395 | A | 1/1993 | Lovell et al. |
| 5,333,868 | A | 8/1994 | Goldfarb et al. |
| 5,566,942 | A | 10/1996 | Elum |
| 5,611,730 | A | 3/1997 | Weiss et al. |
| 5,664,998 | A | 9/1997 | Seelig et al. |
| 5,772,509 | A | 6/1998 | Weiss et al. |
| 5,813,672 | A | 9/1998 | Loud et al. |
| 5,855,514 | A | 1/1999 | Kamille et al. |
| 5,931,467 | A | 8/1999 | Kamille et al. |
| 5,941,467 | A | 8/1999 | McArdle et al. |
| 5,961,384 | A | 10/1999 | Robinson et al. |

(Continued)

FOREIGN PATENT DOCUMENTS

| | | |
|---|---|---|
| EP | 0 945 837 | 9/1999 |
| EP | 1 199 689 | 4/2002 |

(Continued)

*Primary Examiner* — Ronald Laneau

(74) *Attorney, Agent, or Firm* — Neal, Gerber & Eisenberg LLP

(57) ABSTRACT

In various embodiments, the gaming system of the present disclosure is configured to operate a card game associated with a plurality of cards. For a play of the card game, the gaming system receives a wager from a player, determines a plurality of player cards from the plurality of cards, displays the player cards face up, determines a plurality of dealer cards from the plurality of cards, and displays at least one of the dealer cards face up. The gaming system determines an outcome of the play by comparing the player and the dealer cards. If the outcome is a designated outcome, the gaming system adds the received wager to a side pot. If a side pot reset condition is met, the gaming system resets the side pot to an initial value. If a side pot payout condition is met, the gaming system provides the side pot to the player.

35 Claims, 14 Drawing Sheets

(56) References Cited

U.S. PATENT DOCUMENTS 5,980,384 A 11/1999 Barrie
5,996,997 A 12/1999 Kamille et al.
6,015,344 A 1/2000 Kelly et al.
6,015,346 A 1/2000 Bennett
6,089,976 A 7/2000 Schneider et al.
6,102,798 A 8/2000 Bennett
6,126,542 A 10/2000 Fier
6,134,556 A 10/2000 Shin
6,159,095 A 12/2000 Frohm et al.
6,174,235 B1 1/2001 Walker et al.
6,254,481 B1 7/2001 Jaffe
6,261,177 B1 7/2001 Bennett
6,273,420 B1 8/2001 Brooks
6,309,299 B1 10/2001 Weiss
6,309,300 B1 10/2001 Glavich
6,315,660 B1 11/2001 DeMar et al.
6,315,664 B1 11/2001 Baerlocher et al.
6,319,124 B1 11/2001 Baerlocher et al.
6,328,649 B1 12/2001 Randall et al.
6,346,043 B1 2/2002 Colin et al.
6,347,996 B1 2/2002 Gilmore et al.
6,364,767 B1 4/2002 Brossard et al.
6,398,644 B1 6/2002 Perrie et al.
6,406,369 B1 6/2002 Baerlocher et al.
6,439,995 B1 8/2002 Hughs-Baird et al.
6,443,837 B1 9/2002 Jaffe et al.
6,450,883 B1 9/2002 O'Halloran
6,494,785 B1 12/2002 Gerrard et al.
6,511,375 B1 1/2003 Kaminkow
6,514,141 B1 2/2003 Kaminkow et al.
6,533,273 B2 3/2003 Cole et al.
6,558,254 B2 5/2003 Baelocher et al.
6,561,899 B2 5/2003 Vancura
6,561,902 B1 5/2003 Walker et al.
6,572,469 B2 6/2003 Klitsner et al.
6,572,473 B1 6/2003 Baerlocher
6,582,307 B2 6/2003 Webb
6,589,117 B1 7/2003 Moritome et al.
6,595,854 B2 7/2003 Hughs-Baird et al.
6,599,185 B1 7/2003 Kaminkow et al.
6,602,136 B1 8/2003 Baerlocher et al.
6,602,137 B2 8/2003 Kaminkow et al.
6,605,002 B2 8/2003 Baerlocher
6,607,438 B2 8/2003 Baerlocher et al.
6,609,971 B2 8/2003 Vancura
6,612,574 B1 9/2003 Cole et al.
6,612,575 B1 9/2003 Cole et al.
6,632,141 B2 10/2003 Webb et al.
6,638,164 B2 10/2003 Randall et al.
6,656,040 B1 12/2003 Brosnan et al.
6,659,864 B2 12/2003 McGahn et al.
6,676,516 B2 1/2004 Baerlocher et al.
6,692,356 B2 2/2004 Baerlocher et al.
6,722,981 B2 4/2004 Kaminkow et al.
6,722,982 B2 4/2004 Kaminkow et al.
6,722,983 B2 4/2004 Kaminkow et al.
6,733,386 B2 5/2004 Cuddy et al.
6,743,096 B2 6/2004 Allendorf et al.
6,749,504 B2 * 6/2004 Hughs-Baird .................. 463/25
6,758,747 B2 7/2004 Baerlocher
6,769,983 B2 8/2004 Slomiany
6,780,107 B2 8/2004 Baerlocher et al.
6,780,111 B2 8/2004 Cannon et al.
6,783,457 B2 8/2004 Hughs-Baird et al.
6,814,664 B2 11/2004 Baerlocher et al.
6,817,944 B2 11/2004 Kaminkow et al.
6,832,959 B2 12/2004 Baerlocher
6,837,793 B2 1/2005 McClintic
6,843,721 B2 1/2005 Vancura
6,843,722 B2 1/2005 Webb
6,852,028 B2 2/2005 Vancura
6,863,606 B1 3/2005 Berg et al.
6,875,108 B1 * 4/2005 Hughs-Baird .................. 463/26
6,877,745 B1 4/2005 Walker et al.
6,899,620 B2 5/2005 Kaminkow et al.
6,913,533 B2 7/2005 Cuddy et al.
6,913,535 B2 7/2005 Kaminkow et al.
6,918,830 B2 7/2005 Baerlocher
6,918,834 B2 7/2005 Vancura
6,929,545 B2 8/2005 Vancura
6,932,701 B2 8/2005 Glavich et al.
6,958,013 B2 10/2005 Miereau et al.
6,966,833 B2 11/2005 Kaminkow et al.
7,004,834 B2 2/2006 Walker et al.
7,011,581 B2 3/2006 Cole et al.
7,037,191 B2 5/2006 Rodgers et al.
7,040,984 B2 5/2006 Mead
7,056,214 B2 6/2006 Miereau et al.
7,077,744 B2 7/2006 Cannon
7,104,888 B2 9/2006 Miereau et al.
7,112,137 B2 9/2006 Baerlocher et al.
7,121,942 B2 10/2006 Baerlocher
7,153,205 B2 * 12/2006 Baerlocher ..................... 463/16
7,160,186 B2 1/2007 Cuddy et al.
7,160,188 B2 1/2007 Kaminkow et al.
7,172,506 B2 2/2007 Baerlocher et al.
7,175,523 B2 2/2007 Gilmore et al.
7,182,689 B2 2/2007 Hughs-Baird et al.
7,198,570 B2 4/2007 Rodgers et al.
7,220,180 B2 5/2007 Kaminkow et al.
7,235,011 B2 6/2007 Randall et al.
7,238,109 B2 7/2007 McGahn et al.
7,247,096 B2 7/2007 Vancura
7,264,545 B2 9/2007 Maya et al.
7,270,604 B2 9/2007 Gerrard et al.
7,273,415 B2 9/2007 Cregan et al.
7,300,348 B2 11/2007 Kaminkow et al.
7,303,469 B2 12/2007 Kaminkow
7,311,598 B2 12/2007 Kaminkow et al.
7,311,604 B2 12/2007 Kaminkow et al.
7,314,409 B2 1/2008 Maya et al.
7,316,609 B2 1/2008 Dunn et al.
7,318,773 B2 1/2008 Baerlocher
7,326,115 B2 2/2008 Baerlocher
7,338,367 B2 3/2008 Kaminkow et al.
7,338,369 B2 3/2008 Mierau et al.
7,351,141 B2 4/2008 Rodgers et al.
7,371,174 B2 5/2008 Baerlocher
7,377,849 B2 5/2008 Baerlocher et al.
7,399,228 B2 * 7/2008 Baerlocher ..................... 463/25
7,402,103 B2 7/2008 Baerlocher
7,413,510 B2 8/2008 Schlegel et al.
7,494,411 B2 2/2009 Baerlocher
7,544,129 B2 * 6/2009 Baerlocher ....................... 463/9
7,547,252 B2 6/2009 Peterson et al.
7,566,267 B2 7/2009 Vancura
7,566,271 B2 7/2009 Hostetler et al.
7,566,272 B2 7/2009 Gerrard et al.
7,578,736 B2 8/2009 Baerlocher et al.
7,585,218 B2 9/2009 Mead et al.
7,591,722 B2 9/2009 Baerlocher et al.
7,601,058 B2 10/2009 Slomiany
7,618,316 B2 11/2009 Cole et al.
7,690,981 B2 4/2010 Ching et al.
7,726,655 B2 6/2010 Walker et al.
7,727,068 B2 6/2010 Peterson
7,744,454 B2 6/2010 Mierau et al.
7,749,070 B2 7/2010 Baerlocher et al.
7,749,074 B2 7/2010 Cole et al.
7,785,188 B2 8/2010 Cannon
7,806,760 B2 10/2010 Baerlocher
7,824,263 B2 11/2010 Baerlocher
7,833,095 B2 11/2010 Cuddy et al.
7,837,554 B2 11/2010 Kaminkow et al.
7,867,074 B2 1/2011 Gerrard et al.
7,874,912 B2 1/2011 Cregan et al.
7,887,409 B2 2/2011 Baerlocher et al.
7,914,373 B2 3/2011 Webb et al.
7,942,737 B2 5/2011 Cregan et al.
7,963,841 B2 6/2011 Baerlocher et al.
7,976,382 B2 7/2011 Benbrahim
8,079,903 B2 12/2011 Nicely et al.
2002/0183105 A1 12/2002 Cannon et al.
2003/0013514 A1 1/2003 Cregan et al.

(56) References Cited

U.S. PATENT DOCUMENTS

| | | | | |
|---|---|---|---|---|
| 2003/0036422 | A1 | 2/2003 | Baerlocher et al. | |
| 2003/0036424 | A1 | 2/2003 | Baerlocher | |
| 2003/0040358 | A1 | 2/2003 | Rothkranz et al. | |
| 2003/0045349 | A1 * | 3/2003 | Hughs-Baird | 463/25 |
| 2003/0064773 | A1 | 4/2003 | Baerlocher et al. | |
| 2003/0078096 | A1 | 4/2003 | Kaminkow et al. | |
| 2003/0153378 | A1 | 8/2003 | Schlegel et al. | |
| 2003/0157982 | A1 | 8/2003 | Gerrard et al. | |
| 2003/0162578 | A1 | 8/2003 | Baerlocher et al. | |
| 2004/0048644 | A1 | 3/2004 | Gerrard et al. | |
| 2004/0048649 | A1 | 3/2004 | Peterson et al. | |
| 2004/0053665 | A1 | 3/2004 | Baerlocher | |
| 2004/0152500 | A1 * | 8/2004 | Baerlocher | 463/16 |
| 2004/0176156 | A1 | 9/2004 | Walker et al. | |
| 2004/0242315 | A1 | 12/2004 | Paulsen et al. | |
| 2004/0248639 | A1 | 12/2004 | Slomiany | |
| 2005/0020351 | A1 | 1/2005 | Baerlocher et al. | |
| 2005/0033461 | A1 | 2/2005 | Gerrard et al. | |
| 2005/0054404 | A1 | 3/2005 | Baerlocher | |
| 2005/0054405 | A1 | 3/2005 | Baerlocher et al. | |
| 2005/0054415 | A1 | 3/2005 | Kaminkow et al. | |
| 2005/0054416 | A1 | 3/2005 | Hostetler et al. | |
| 2005/0054435 | A1 | 3/2005 | Rodgers et al. | |
| 2005/0059456 | A1 | 3/2005 | Mead et al. | |
| 2005/0059461 | A1 | 3/2005 | Ching et al. | |
| 2005/0064928 | A1 | 3/2005 | Baerlocher et al. | |
| 2005/0096114 | A1 | 5/2005 | Cannon et al. | |
| 2005/0096123 | A1 | 5/2005 | Cregan et al. | |
| 2005/0101372 | A1 | 5/2005 | Mierau et al. | |
| 2005/0181860 | A1 | 8/2005 | Nguyen et al. | |
| 2005/0192081 | A1 | 9/2005 | Marks et al. | |
| 2005/0197180 | A1 | 9/2005 | Kaminkow et al. | |
| 2005/0218591 | A1 | 10/2005 | Torigian et al. | |
| 2006/0030401 | A1 | 2/2006 | Mead et al. | |
| 2006/0052157 | A1 | 3/2006 | Walker et al. | |
| 2006/0068882 | A1 | 3/2006 | Baerlocher et al. | |
| 2006/0073874 | A1 | 4/2006 | Cregan et al. | |
| 2006/0084500 | A1 | 4/2006 | Baerlocher et al. | |
| 2006/0183528 | A1 | 8/2006 | Rodgers et al. | |
| 2006/0199628 | A1 | 9/2006 | Rodgers et al. | |
| 2006/0246977 | A1 | 11/2006 | Cannon | |
| 2007/0015566 | A1 | 1/2007 | Baerlocher et al. | |
| 2007/0032285 | A1 | 2/2007 | Wolf | |
| 2007/0054732 | A1 | 3/2007 | Baerlocher | |
| 2007/0060271 | A1 | 3/2007 | Cregan et al. | |
| 2007/0060300 | A1 | 3/2007 | Baerlocher | |
| 2007/0077990 | A1 | 4/2007 | Cuddy et al. | |
| 2007/0087809 | A1 | 4/2007 | Baerlocher | |
| 2007/0105620 | A1 | 5/2007 | Cuddy et al. | |
| 2007/0111783 | A1 | 5/2007 | Cuddy et al. | |
| 2007/0117606 | A1 | 5/2007 | Baerlocher et al. | |
| 2007/0129131 | A1 | 6/2007 | Kaminkow et al. | |
| 2007/0149267 | A1 | 6/2007 | Ross et al. | |
| 2007/0149269 | A1 | 6/2007 | Benbrahim | |
| 2007/0155485 | A1 | 7/2007 | Cuddy et al. | |
| 2007/0167211 | A1 | 7/2007 | Rodgers et al. | |
| 2008/0146321 | A1 | 6/2008 | Parente | |
| 2008/0188287 | A1 | 8/2008 | Schlegel et al. | |
| 2009/0104959 | A1 | 4/2009 | Caputo et al. | |
| 2009/0253492 | A1 | 10/2009 | Caputo et al. | |
| 2010/0004044 | A1 | 1/2010 | Slomiany | |
| 2010/0048282 | A1 | 2/2010 | Nicely et al. | |
| 2010/0120505 | A1 | 5/2010 | Caputo et al. | |
| 2010/0234095 | A1 | 9/2010 | Cole et al. | |
| 2011/0183750 | A1 | 7/2011 | Cregan et al. | |
| 2012/0071232 | A1 | 3/2012 | Nicely et al. | |

FOREIGN PATENT DOCUMENTS

| | | |
|---|---|---|
| EP | 1 298 607 | 4/2003 |
| EP | 1 531 434 | 5/2005 |
| GB | 2 113 881 | 8/2003 |
| WO | WO 01/74464 | 10/2001 |
| WO | WO 03/026759 | 4/2003 |
| WO | WO 2005/002697 | 1/2005 |
| WO | WO 2006/017036 | 2/2006 |
| WO | WO 2006/017068 | 2/2006 |
| WO | WO 2007/021724 | 2/2007 |
| WO | WO 2007/052549 | 5/2007 |
| WO | WO 2007/103054 | 9/2007 |

* cited by examiner

GAMING SYSTEM AND METHOD PROVIDING A SELECTION GAME ASSOCIATED WITH SELECTABLE VISUALLY UNBLOCKED OBJECTS AND UNSELECTABLE VISUALLY BLOCKED OBJECTS

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines that provide players awards in primary or base games are well known. These gaming machines generally require a player to place a wager to activate a play of the primary game. For many of these gaming machines, any award provided to a player for a wagered-on play of a primary game is based on the player obtaining a winning symbol or a winning symbol combination and on an amount of the wager (e.g., the higher the amount of the wager, the higher the award). Winning symbols or winning symbol combinations that are less likely to occur typically result in higher awards being provided when they do occur.

For such known gaming machines, an amount of a wager placed on a primary game by a player may vary. For instance, a gaming machine may enable a player to wager a minimum quantity of credits, such as one credit (e.g., one penny, nickel, dime, quarter, or dollar), up to a maximum quantity of credits, such as five credits. The gaming machine may enable the player to place this wager a single time or multiple times for a single play of the primary game. For instance, a gaming machine configured to operate a slot game may have one or more paylines, and the gaming machine may enable a player to place a wager on each of the paylines for a single play of the slot game. Thus, it is known that a gaming machine, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such as video draw poker, in which players can place wagers of one or more credits on each hand, and in which multiple hands can be played simultaneously. Accordingly, it should be appreciated that different players play at substantially different wager amounts or levels and substantially different rates of play.

Bonus or secondary games are also known in gaming machines. Such gaming machines usually provide an award to a player for a play of one such bonus game in addition to any awards provided for any plays of any primary games. Bonus games usually do not require an additional wager to be placed by the player to be initiated. Bonus games are typically initiated or triggered upon an occurrence of a designated triggering symbol or designated triggering symbol combination in the primary game. For instance, a gaming machine may initiate or trigger a bonus game when a bonus symbol occurs on the payline on the third reel of a three reel slot machine. The gaming machine generally indicates when a bonus game is initiated or triggered through one or more visual and/or audio output devices, such as the reels, lights, speakers, display screens, etc. Part of the enjoyment and excitement of playing certain gaming machines is the initiation or triggering of a bonus game, even before the player knows an amount of a bonus award won via the bonus game.

Many known gaming systems employ a variety of different selection type games as bonus games. Upon an initiation of certain of these known selection type bonus games, the gaming system displays a plurality of selections or indicators, such as numbers; letters; or graphical representations of people, places, or things, and enables a player to pick one of the displayed selections or indicators. If the picked selection or indicator is associated with an award, the gaming system provides the player that award. In certain selection games, if the picked selection is associated with a bonus game terminator instead of or in addition to an award, the gaming system terminates the selection type bonus game. In other selection games, the gaming system provides the player with a limited quantity of picks (such as five picks), and enables the player to use each pick to select one of the displayed selections or indicators.

There is a continuing need to provide new, exciting, and engaging bonus games and, in particular, new, exciting, and engaging variations of selection type bonus games, to increase player enjoyment and excitement.

SUMMARY

The present disclosure is directed to a gaming system and method providing a selection game associated with selectable visually unblocked objects and unselectable visually blocked objects.

Generally, upon initiation of the selection game of the present disclosure, the gaming system displays a plurality of objects randomly scattered throughout an object display area such that certain of the objects visually block or cover portions of certain of the other objects. That is, certain of the objects are at least partially visually blocked or covered by certain of the other objects and certain of the objects are not visually blocked or covered by any of the other objects (i.e., are unblocked or uncovered).

The gaming system provides a player with a quantity of picks and enables the player to, until the player's quantity of picks runs out, use the picks to sequentially select unblocked or uncovered objects. For each selected object, the gaming system provides the player any award associated with that selected object and removes that selected object from the object display area, thereby revealing any portion(s) of any other object(s) that that selected object was visually blocking or covering. It should thus be appreciated that the selection and subsequent removal of objects may unblock or uncover other objects such that those (now) unblocked or uncovered objects may later be selected.

More specifically, in various embodiments, the gaming system is configured to initiate the selection game of the present disclosure upon an occurrence of a bonus triggering event in association with a play of a base game by a player. Upon an occurrence of the bonus triggering event, the gaming system initiates a play of the selection game and provides the player a quantity of one or more picks. The gaming system displays a plurality of objects in an object display area such that at least a portion of each of one or more of the objects is visually blocked or covered by at least one of the other objects and such that one or more of the objects are not visually blocked or covered by any of the other objects. The gaming system enables the player to select one of the objects that are not visually blocked or covered by any of the other objects and does not enable the player to select any of the objects that are visually blocked or covered by one or more of the other objects.

The gaming system receives a selection of one of the objects that are not visually blocked or covered by any of the other objects, reduces the player's quantity of picks, and provides any award associated with the selected object. The gaming system removes the selected object from the object display area such that: (i) the selected object is no longer displayed in the object display area; and (ii) a non-displayed portion of at least one of the objects visually blocked or covered by the selected object, if any, is revealed. If the player has at least a designated quantity of picks remaining, the gaming system repeats the above process by again enabling the player to select one of the objects that are not visually blocked or covered by any of the other objects without enabling the player to select any of the objects that are visually blocked or covered by one or more of the other objects.

It should thus be appreciated that the gaming system of the present disclosure is configured to provide new, exciting, and engaging variations of a selection game, thereby increasing player enjoyment and entertainment.

Additional features and advantages are described herein, and will be apparent from, the following Detailed Description and the Figures.

DETAILED DESCRIPTION

Selection Game Associated with Selectable Visually Unblocked Objects and Unselectable Visually Blocked Objects Various embodiments of the present disclosure are directed to a gaming system and method providing a selection game associated with selectable visually unblocked objects and unselectable visually blocked objects. While the selection game of the present disclosure is a bonus game in the embodiments described below, it should be appreciated that the selection game may additionally or alternatively be employed as a base or primary game. Moreover, while certain of the awards described below are amounts of monetary credits or currency, one or more of such awards may include non-monetary credits, promotional credits, and/or player tracking points or credits. Although not described below in the embodiments in which the selection game is a bonus game, it should be appreciated that the player's credit balance and any wagers placed by the player may also be provided in non-monetary credits, promotional credits, and/or player tracking points or credits.

Figure 1:
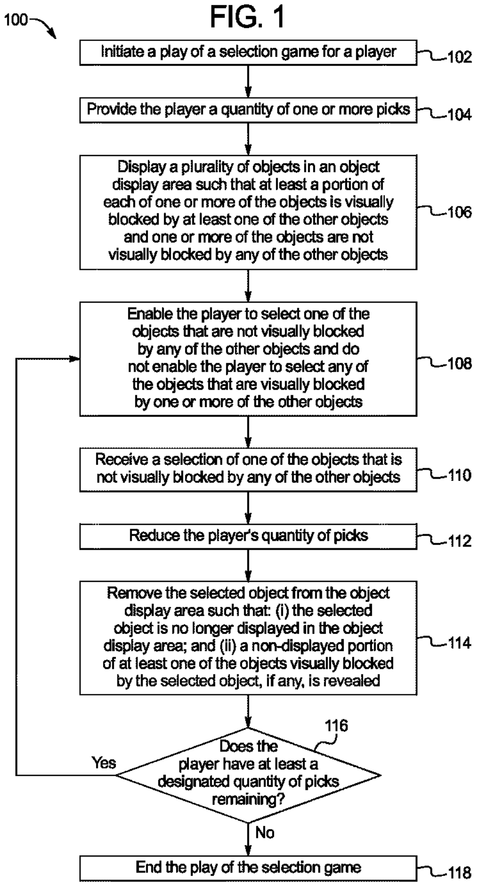
FIG. 1 is a flowchart illustrating an example method of operating one embodiment of the gaming system of the present disclosure.

FIG. 1 illustrates a flowchart of an example process or method 100 of operating the gaming system of the present disclosure. In various embodiments, process 100 is represented by a set of instructions stored in one or more memories and executed by one or more processors. Although process 100 is described with reference to the flowchart shown in FIG. 1, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In this example, upon an occurrence of a bonus triggering event in association with a play of a base game by a player, the gaming system initiates a play of a selection game, as indicated by block 102. For the play of the selection game, the gaming system provides the player a quantity of one or more picks, as indicated by block 104. The gaming system displays a plurality of objects in an object display area such that at least a portion of each of one or more of the objects is visually blocked by at least one of the other objects and one or more of the objects are not visually blocked by any of the other objects, as indicated by block 106. The gaming system enables the player to select one of the objects that are not visually blocked by any of the other objects and does not enable the player to select any of the objects that are visually blocked by one or more of the other objects, as indicated by block 108.

The gaming system receives a selection of one of the objects that is not visually blocked by any of the other objects, as indicated by block 110. The gaming system reduces the player's quantity of picks, as indicated by block 112. The gaming system removes the selected object from the object display area such that: (i) the selected object is no longer displayed in the object display area; and (ii) a non-displayed portion of at least one of the objects visually blocked by the selected object, if any, is revealed, as indicated by block 114. The gaming system determines whether the player has at least a designated quantity of picks remaining, as indicated by diamond 116. If the gaming system determines that the player has at least the designated quantity of picks remaining, process 100 returns to block 108. If, on the other hand, the gaming system determines that the player does not have at least the designated quantity of picks remaining, the gaming system ends the play of the selection game, as indicated by block 118.

FIGS. 2A, 2B, 2C, 2D, 2E, 2F, 2G, 2H, and 2I illustrate screen shots of one embodiment of the gaming system of the present disclosure providing a play of one example of the selection game. In this example, a play of the selection game is initiated when a bonus game triggering event occurs during play of a base game (not shown). It should be appreciated that the base game may be any suitable game (such as any of those described below) and that the bonus game triggering event may be any suitable event(s) based on any suitable factor(s).

For the play of the selection game, the gaming system displays, such as on a display device 1116 or 1118 (described below), an object display area 220. The gaming system displays a plurality of objects randomly scattered throughout the object display area such that certain of the objects visually block or cover certain of the other objects. That is, the gaming system displays the objects such that at least a portion of each of one or more of the objects is visually blocked by at least one of the other objects and such that certain of the objects are not visually blocked by any of the other objects, and that the gaming system may display any suitable quantity of objects.

It should also be appreciated that the quantity of objects may be: (a) predetermined; (b) randomly determined; (c) determined based on game play (e.g., on play of the base game); (d) determined based on which of a plurality of different bonus game triggering events occur to trigger the play of the selection game; (e) determined based on coin-in and/or coin-out; (f) determined based on the denomination of the gaming system; (g) determined based on time; (h) determined based on the player's total wager; (i) determined based on the quantity of paylines wagered on; (j) determined based on the redemption of non-monetary credits such as promotional credits; (k) determined based on the redemption of bonusing points or credits; (l) determined based on a quantity of remaining, non-selected objects in a previous play of the selection game; and/or (m) determined in any other suitable manner(s) or based on any other suitable factor(s).

It should also be appreciated that the objects may be any suitable objects. In this example, the objects are identically-sized rectangular bars. In other embodiments: (a) at least two of the objects having a same shape are differently-sized, (b) at least two of the objects are of different shapes, (c) the objects are playing cards, (d) the objects are symbols, and (e) the objects are three-dimensional objects or three-dimensional representations of objects.

In this example, each of the objects is associated with at least one of a plurality of different awards, though it should be appreciated that in other embodiments at least one of the objects is not associated with any award. In this example, each of the objects has or is associated with one of a plurality of different visual characteristics that are, in turn, each associated with one of the awards. In this example, the visual characteristics include the following patterns: a blank pattern, an octagon shaped pattern, a vertical line patter, a horizontal line pattern, a square shaped patter, and a diamond shaped pattern. Each of the patterns (i.e., the visual characteristics, in this example) is associated with one of the different awards. More specifically, the blank patter is associated with an award of 5 credits; the octagon shape pattern is associated with an award of 10 credits; the vertical line patter is associated with an award of 25 credits; the horizontal line pattern is associated with an award of 50 credits; the square shaped pattern is associated with an award of 150 credits; and the diamond shaped pattern is associated with an award of 1,000 credits. Thus, in this example, the visual appearance of each object (i.e., the pattern associated with that object) determines the award associated with that object.

Upon initiation of the play of the selection game, the gaming system determines a quantity of picks and provides the determined quantity of picks to the player for use during the play of the selection game. The gaming system displays the player's quantity of picks in picks remaining display 212. In this example, the gaming system randomly determines the quantity of picks, though it should be appreciated that, in other embodiments, the quantity of picks is: (a) predetermined; (b) determined based on game play (e.g., on play of the base game); (c) determined based on which of a plurality of different bonus game triggering events occur to trigger the play of the selection game; (d) determined based on coin-in and/or coin-out; (e) determined based on the denomination of the gaming system; (f) determined based on time; (g) determined based on the initial quantity of objects (e.g., the gaming system provides a quantity of picks equal to one-half (or any suitable fraction) of the total quantity of initially-displayed objects); (h) determined based on the player's total wager; (i) determined based on the quantity of paylines wagered on; (j) determined based on the redemption of non-monetary credits such as promotional credits; (k) determined based on the redemption of bonusing points or credits; and/or (l) determined in any other suitable manner(s) or based on any other suitable factor(s).

The gaming system also displays an award display 214 that displays any awards won during the play of the selection game; a message box 216 that displays messages or indications before, during, or after play of the selection game; and a paytable 218 that displays the awards associated with the different patterns. While in this illustrated example the gaming system indicates any awards provided to the player in the form of amounts of credits, it should be appreciated that such indications may alternatively or additionally be made in the form of amounts of currency.

Figure 2A:
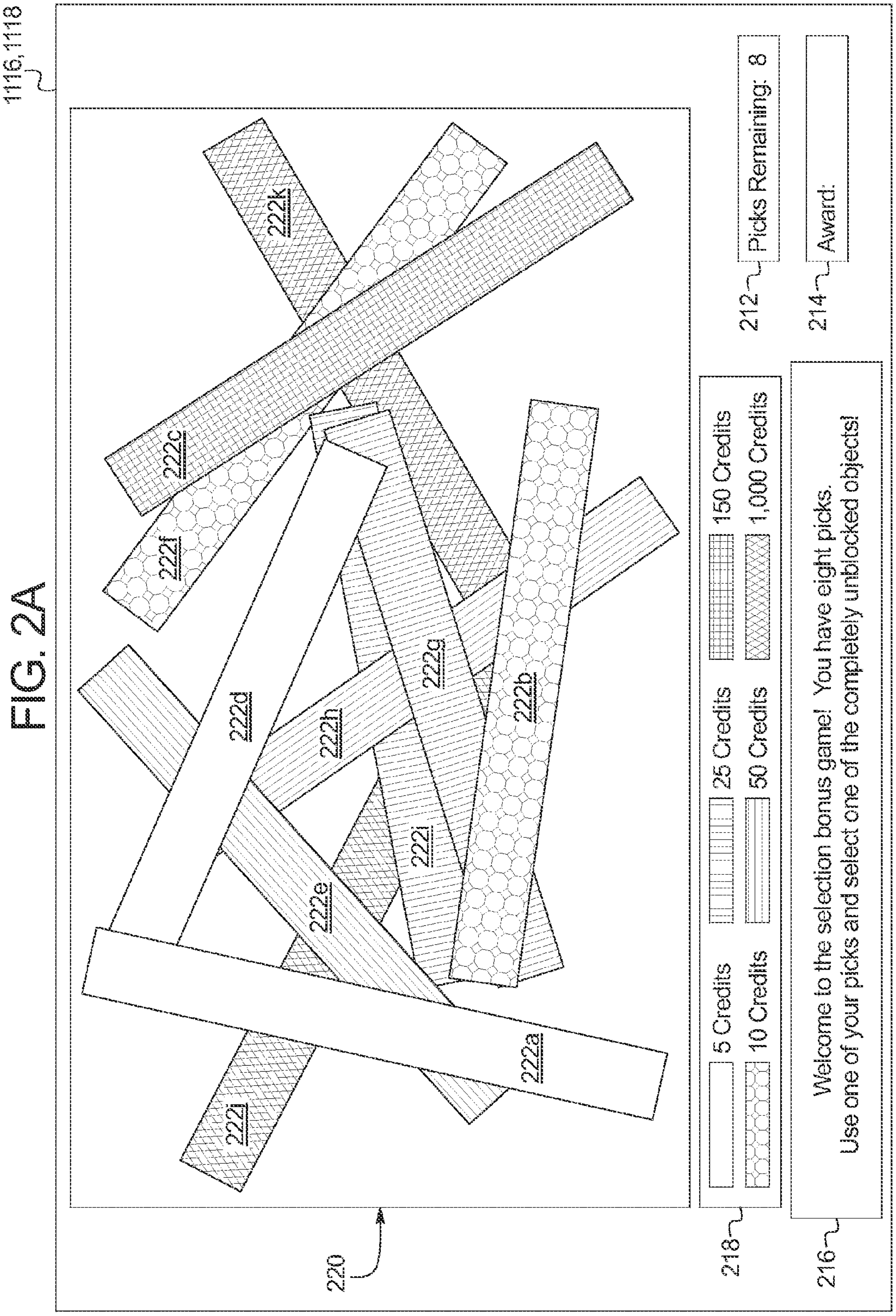
FIGS. 2A, 2B, 2C, 2D, 2E, 2F, 2G, 2H, and 2I illustrate screen shots of one embodiment of the gaming system of the present disclosure operating one example of the selection game of the present disclosure.

As illustrated in FIG. 2A, the bonus game triggering event occurs during play of a base game by a player, and the gaming system initiates a play of the selection game. The gaming system randomly determines and displays and a plurality of objects 222*a*, 222*b*, 222*c*, 222*d*, 222*e*, 222*f*, 222*g*, 222*h*, 222*i*, 222*j*, and 222*k* scattered throughout object display area 220 such that at least a portion of each of certain of the objects are visually blocked by at least one of the other objects and such that certain of the objects are not visually blocked by any of the other objects. Specifically, in this example, objects 222*a*, 222*b*, and 222*c* are not visually blocked by any of the other objects, while at least a portion of each of objects 222*d*, 222*e*, 222*f*, 222*g*, 222*h*, 222*i*, 222*j*, and 222*k* is visually blocked by at least one of the other objects. Each of objects 222*a* and 222*d* has the blank pattern, each of objects 222*b* and 222*f* has the octagon shape pattern, each of objects 222*g* and 222*i* has the vertical line pattern, each of objects 222*h* and 222*e* has the horizontal line pattern, object 222*c* has the square shaped pattern, and each of objects 222*j* and 222*k* has the diamond shaped pattern.

Upon initiation of the play of the selection game, the gaming system randomly determines a quantity of eight picks, provides those eight picks to the player, and displays the player's quantity of eight picks in picks remaining display 212. The gaming system enables the player to use one of the player's quantity of picks to select one of the objects that are not visually blocked by any of the other objects. The gaming system does not enable the player to select any of the objects that are visually blocked, in whole or in part, by at least one of the other objects. That is, at this point in time, the gaming system enables the player to select one of objects 222*a*, 222*b*, and 222*c*. The gaming system displays the following message in message box 216: "WELCOME TO THE SELECTION BONUS GAME! YOU HAVE EIGHT PICKS. USE ONE OF YOUR PICKS TO SELECT ONE OF THE COMPLETELY UNBLOCKED OBJECTS!"

Figure 2B:
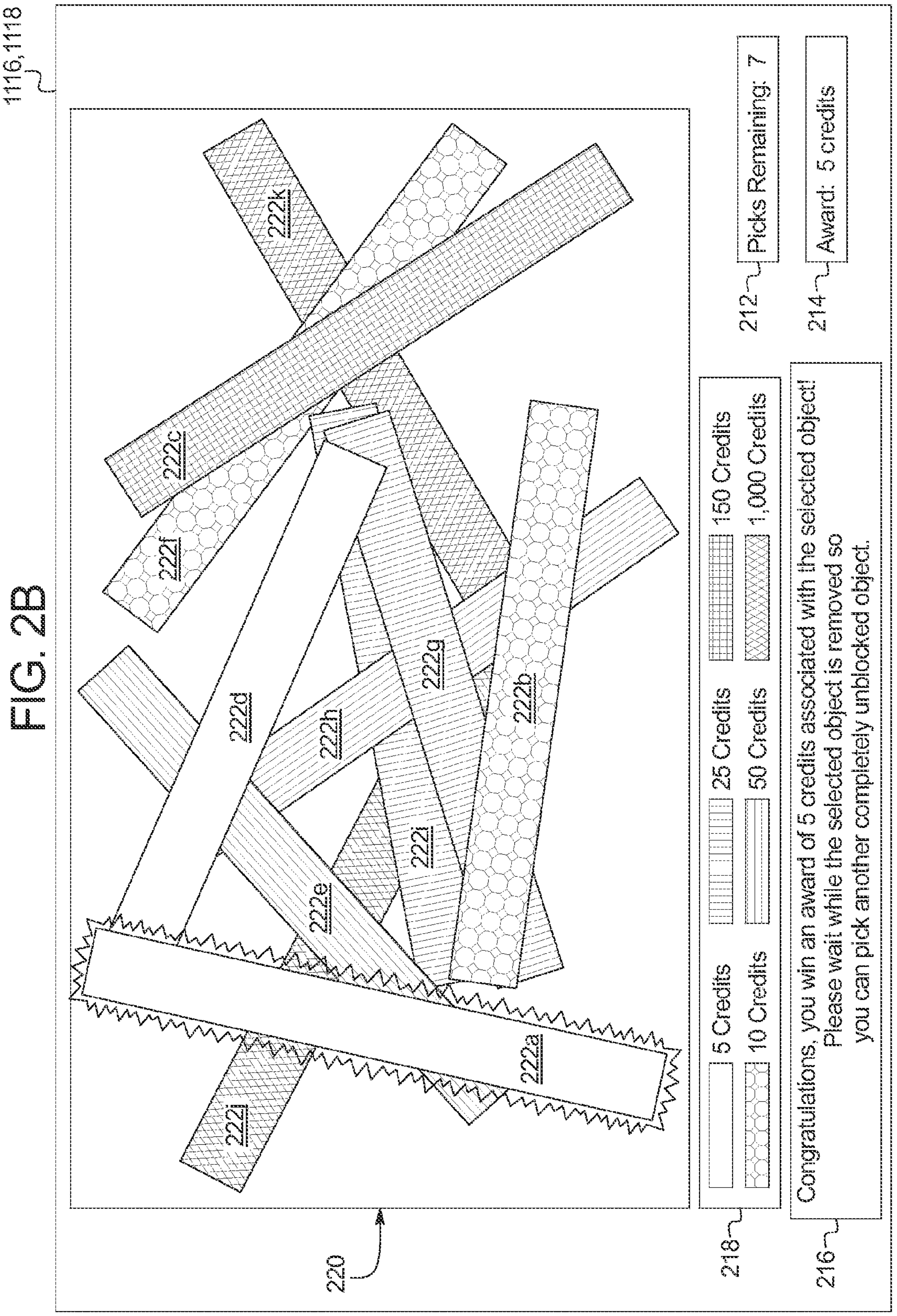
Figure 2C:
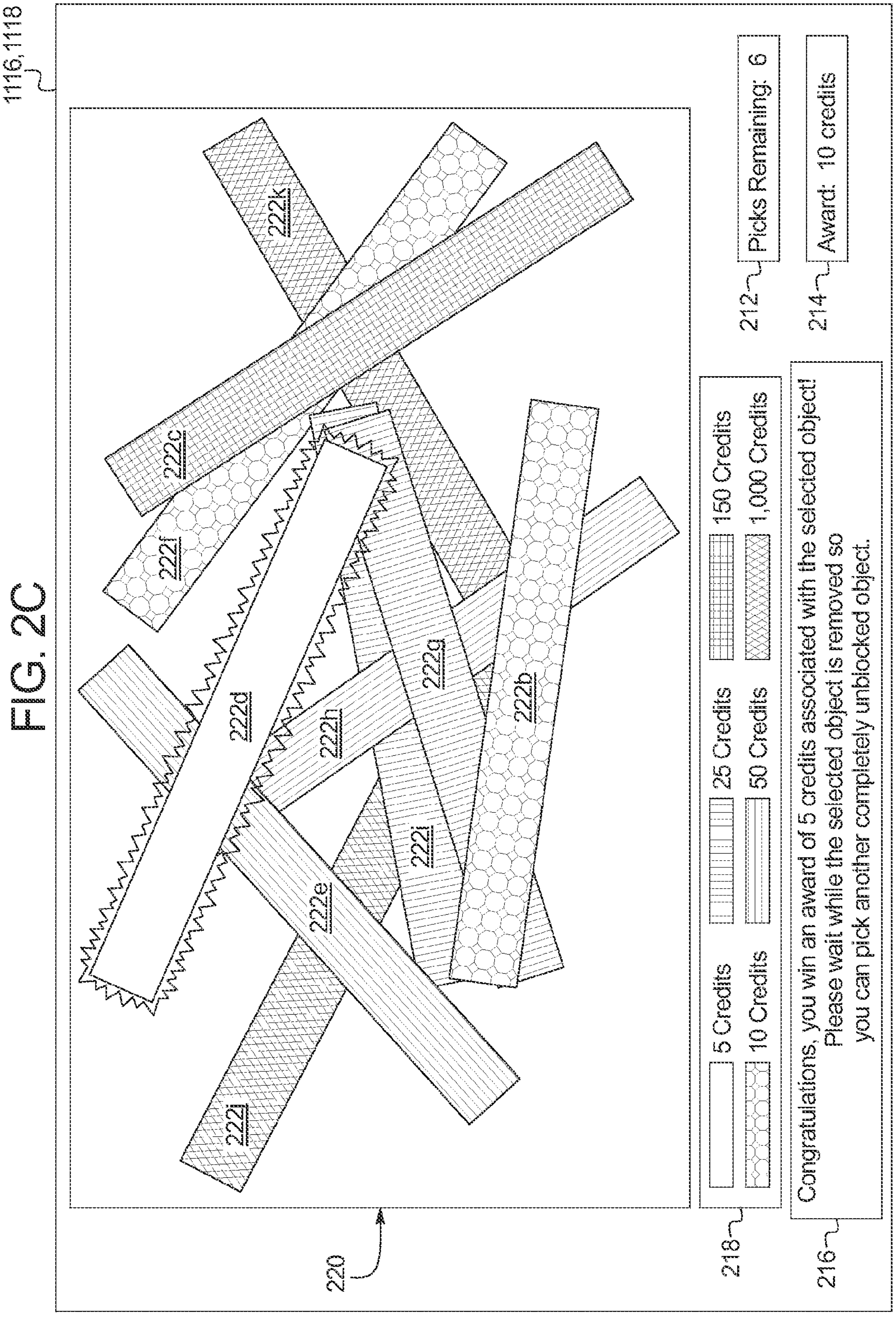

As illustrated in FIG. 2B, the gaming system receives a selection of object 222*a* from the player. The gaming system reduces the player's quantity of picks by one (from eight to seven) and updates picks remaining display 212 accordingly. The gaming system provides the player the 5 credit award associated with object 222*a* and updates award display 214 to reflect the 5 credit award (i.e., increases the player's award from 0 credits to 5 credits). The gaming system removes object 222*a* from object display area 220 such that: (i) object 222*a* is no longer displayed in object display area 220 (as shown in FIG. 2C); and (ii) portions of objects 222*d*, 222*e*, and 222*j* that are visually blocked by object 222*a* are revealed (as shown in FIG. 2C). The gaming system then enables the player to use another one of the player's picks to select one of the objects that is not visually blocked by any of the other objects. That is, at this point in time, the gaming system enables the player to select one of objects 222*b*, 222*c*, and 222*d*. The gaming system displays the following message in message box 216: “CONGRATULATIONS, YOU WIN AN AWARD OF 5 CREDITS ASSOCIATED WITH THE SELECTED OBJECT!PLEASE WAIT WHILE THE SELECTED OBJECT IS REMOVED SO YOU CAN PICK ANOTHER COMPLETELY UNBLOCKED OBJECT!”

Figure 2D:
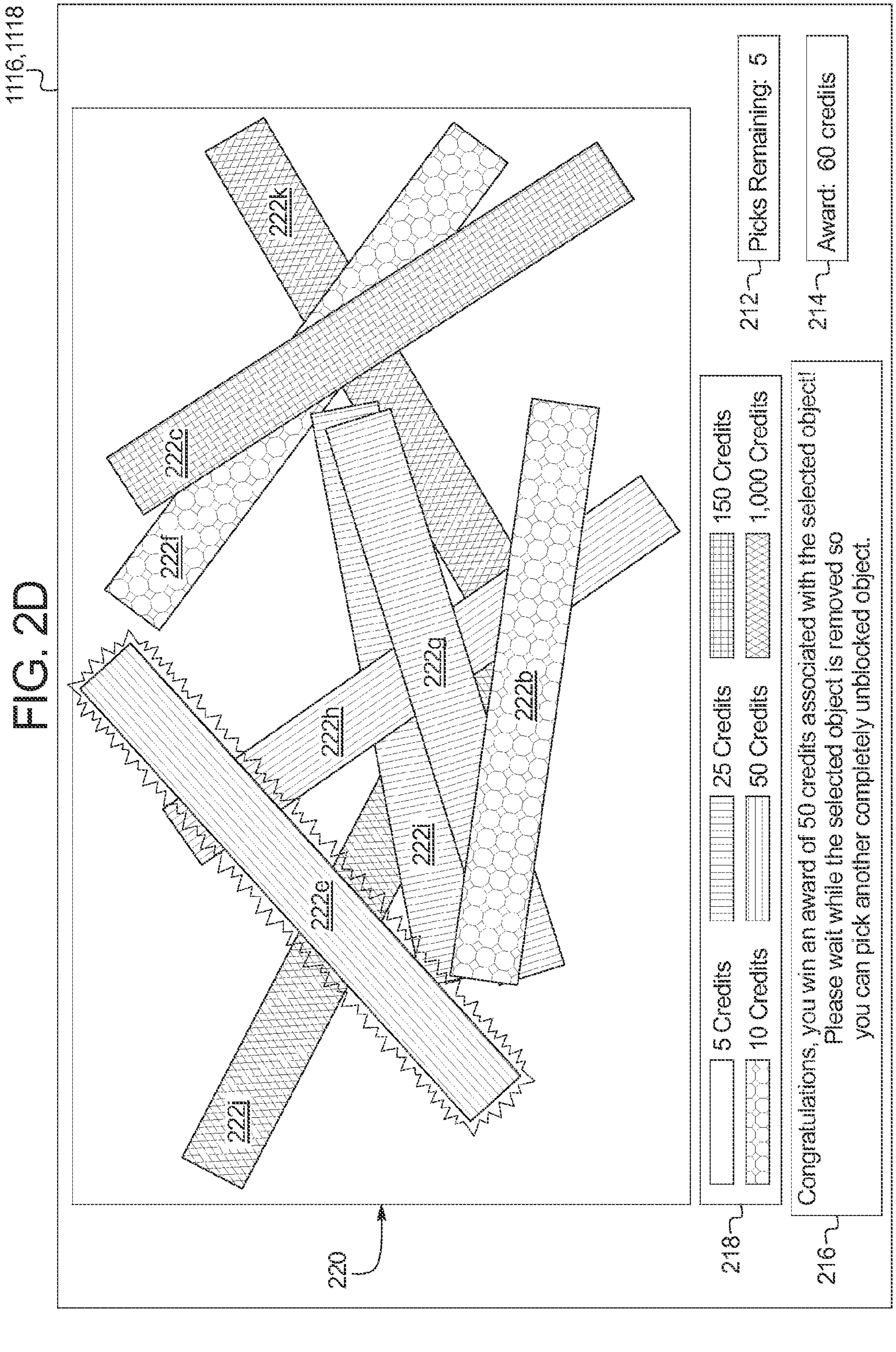

As illustrated in FIG. 2C, the gaming system removed object 222*a* from object display area 220 such that: (i) object 222*a* is no longer displayed in object display area 220; and (ii) portions of objects 222*d*, 222*e*, and 222*j* that were visually blocked by object 222*a* were revealed. The gaming system receives a selection of object 222*d* from the player. The gaming system reduces the player’s quantity of picks by one (from seven to six) and updates picks remaining display 212 accordingly. The gaming system provides the player the 5 credit award associated with object 222*d* and updates award display 214 to reflect the 5 credit award (i.e., increases the player’s award from 5 credits to 10 credits). The gaming system removes object 222*d* from object display area 220 such that: (i) object 222*d* is no longer displayed in object display area 220 (as shown in FIG. 2D); and (ii) portions of objects 222*e*, 222*g*, 222*h*, and 222*i* that are visually blocked by object 222*d* are revealed (as shown in FIG. 2D). The gaming system then enables the player to use another one of the player’s picks to select one of the objects that is not visually blocked by any of the other objects. That is, at this point in time, the gaming system enables the player to select one of objects 222*b*, 222*c*, and 222*e*. The gaming system displays the following message in message box 216: “CONGRATULATIONS, YOU WIN AN AWARD OF 5 CREDITS ASSOCIATED WITH THE SELECTED OBJECT!PLEASE WAIT WHILE THE SELECTED OBJECT IS REMOVED SO YOU CAN PICK ANOTHER COMPLETELY UNBLOCKED OBJECT!”

Figure 2E:
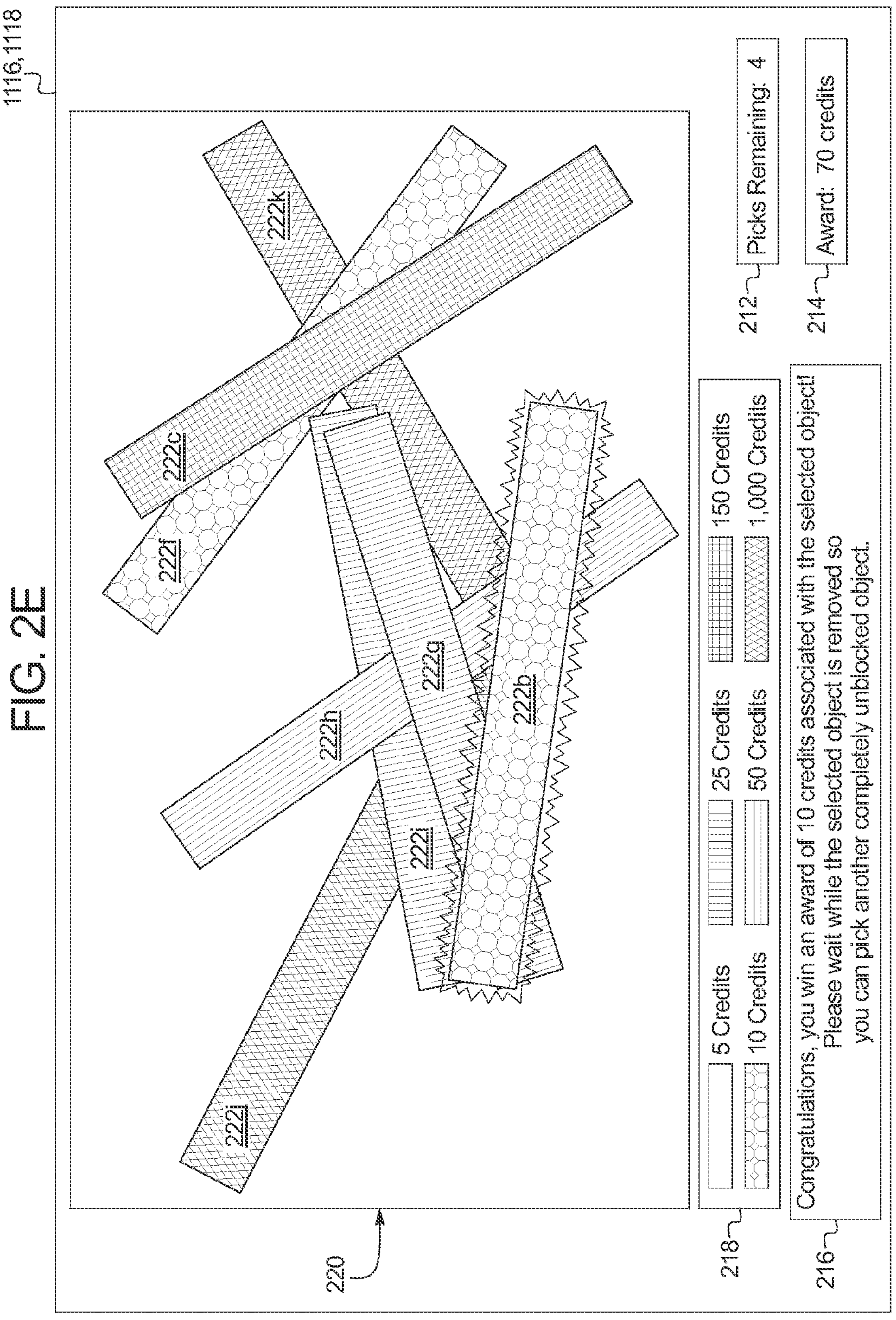

As illustrated in FIG. 2D, the gaming system removed object 222*d* from object display area 220 such that: (i) object 222*d* is no longer displayed in object display area 220; and (ii) portions of objects 222*e*, 222*g*, 222*h*, and 222*i* that were visually blocked by object 222*d* were revealed. The gaming system receives a selection of object 222*e* from the player. The gaming system reduces the player’s quantity of picks by one (from six to five) and updates picks remaining display 212 accordingly. The gaming system provides the player the 50 credit award associated with object 222*e* and updates award display 214 to reflect the 50 credit award (i.e., increases the player’s award from 10 credits to 60 credits). The gaming system removes object 222*e* from object display area 220 such that: (i) object 222*e* is no longer displayed in object display area 220 (as shown in FIG. 2E); and (ii) portions of objects 222*h*, 222*i*, and 222*j* that are visually blocked by object 222*e* are revealed (as shown in FIG. 2E). The gaming system then enables the player to use another one of the player’s picks to select one of the objects that is not visually blocked by any of the other objects. That is, at this point in time, the gaming system enables the player to select one of objects 222*b* and 222*c*. The gaming system displays the following message in message box 216: “CONGRATULATIONS, YOU WIN AN AWARD OF 50 CREDITS ASSOCIATED WITH THE SELECTED OBJECT!PLEASE WAIT WHILE THE SELECTED OBJECT IS REMOVED SO YOU CAN PICK ANOTHER COMPLETELY UNBLOCKED OBJECT!”

Figure 2F:
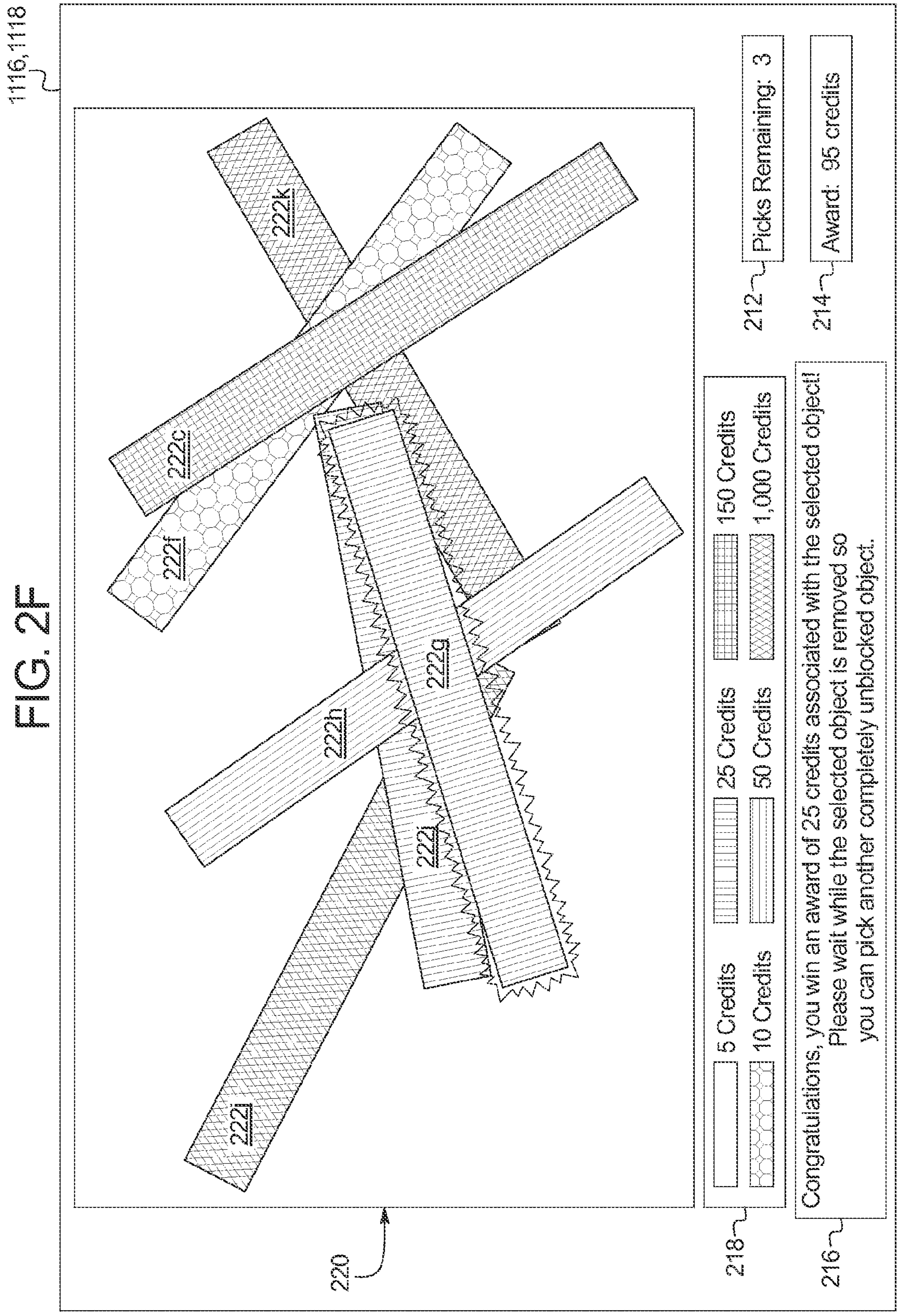

As illustrated in FIG. 2E, the gaming system removed object 222*e* from object display area 220 such that: (i) object 222*e* is no longer displayed in object display area 220; and (ii) portions of objects 222*h*, 222*i*, and 222*j* that were visually blocked by object 222*e* were revealed. The gaming system receives a selection of object 222*b* from the player. The gaming system reduces the player’s quantity of picks by one (from five to four) and updates picks remaining display 212 accordingly. The gaming system provides the player the 10 credit award associated with object 222*b* and updates award display 214 to reflect the 10 credit award (i.e., increases the player’s award from 60 credits to 70 credits). The gaming system removes object 222*b* from object display area 220 such that: (i) object 222*b* is no longer displayed in object display area 220 (as shown in FIG. 2F); and (ii) portions of objects 222*g*, 222*h*, 222*i*, and 222*k* that are visually blocked by object 222*b* are revealed (as shown in FIG. 2F). The gaming system then enables the player to use another one of the player’s picks to select one of the objects that is not visually blocked by any of the other objects. That is, at this point in time, the gaming system enables the player to select one of objects 222*c* and 222*g*. The gaming system displays the following message in message box 216: “CONGRATULATIONS, YOU WIN AN AWARD OF 10 CREDITS ASSOCIATED WITH THE SELECTED OBJECT!PLEASE WAIT WHILE THE SELECTED OBJECT IS REMOVED SO YOU CAN PICK ANOTHER COMPLETELY UNBLOCKED OBJECT!”

Figure 2G:
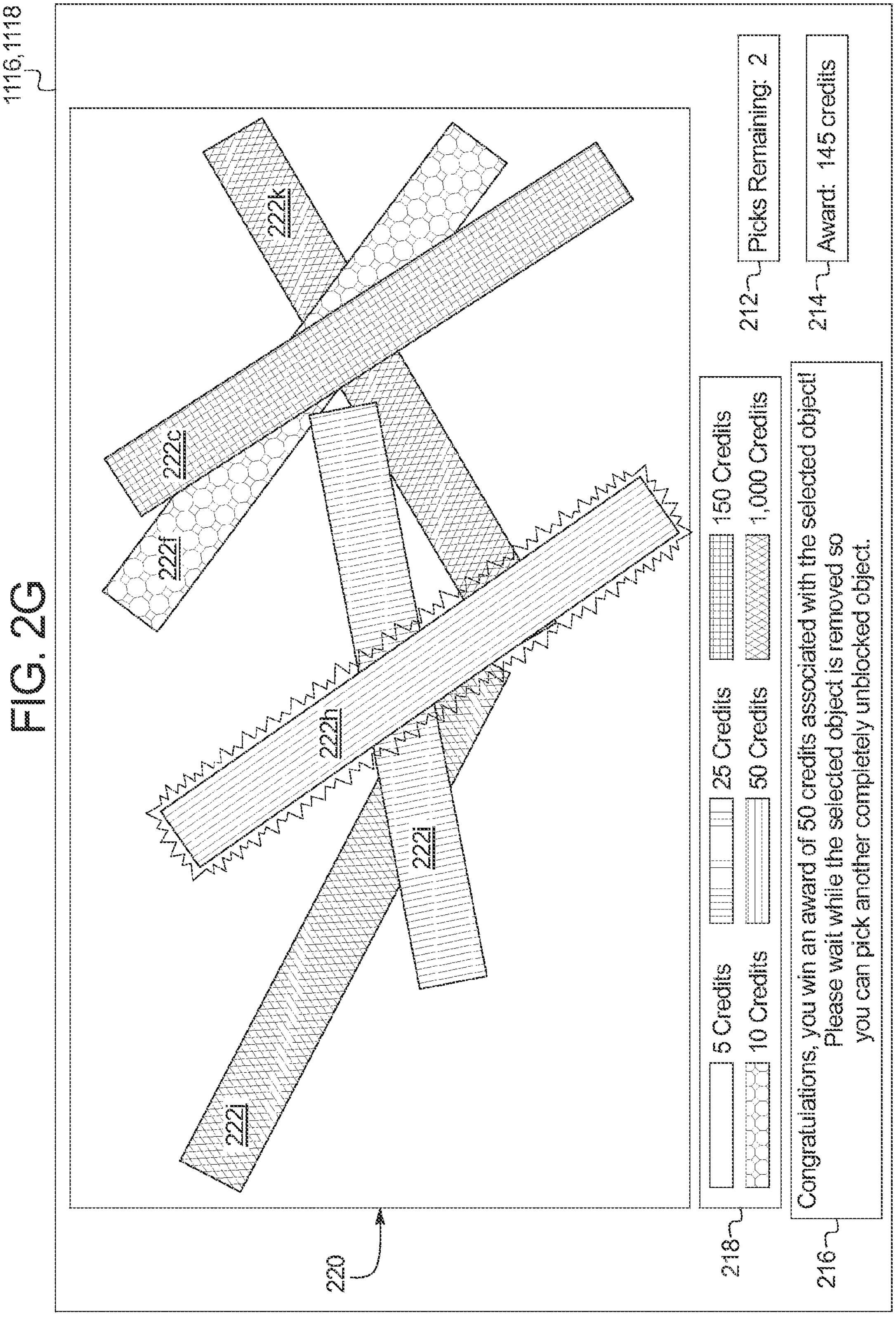

As illustrated in FIG. 2F, the gaming system removed object 222*b* from object display area 220 such that: (i) object 222*b* is no longer displayed in object display area 220; and (ii) portions of objects 222*g*, 222*h*, 222*i*, and 222*k* that were visually blocked by object 222*b* were revealed. The gaming system receives a selection of object 222*g* from the player. The gaming system reduces the player’s quantity of picks by one (from four to three) and updates picks remaining display 212 accordingly. The gaming system provides the player the 25 credit award associated with object 222*g* and updates award display 214 to reflect the 25 credit award (i.e., increases the player’s award from 70 credits to 95 credits). The gaming system removes object 222*g* from object display area 220 such that: (i) object 222*g* is no longer displayed in object display area 220 (as shown in FIG. 2G); and (ii) portions of objects 222*h*, 222*i*, 222*j*, and 222*k* that are visually blocked by object 222*g* are revealed (as shown in FIG. 2G). The gaming system then enables the player to use another one of the player’s picks to select one of the objects that is not visually blocked by any of the other objects. That is, at this point in time, the gaming system enables the player to select one of objects 222*c* and 222*h*. The gaming system displays the following message in message box 216: “CONGRATULATIONS, YOU WIN AN AWARD OF 25 CREDITS ASSOCIATED WITH THE SELECTED OBJECT!PLEASE WAIT WHILE THE SELECTED OBJECT IS REMOVED SO YOU CAN PICK ANOTHER COMPLETELY UNBLOCKED OBJECT!”

Figure 2H:
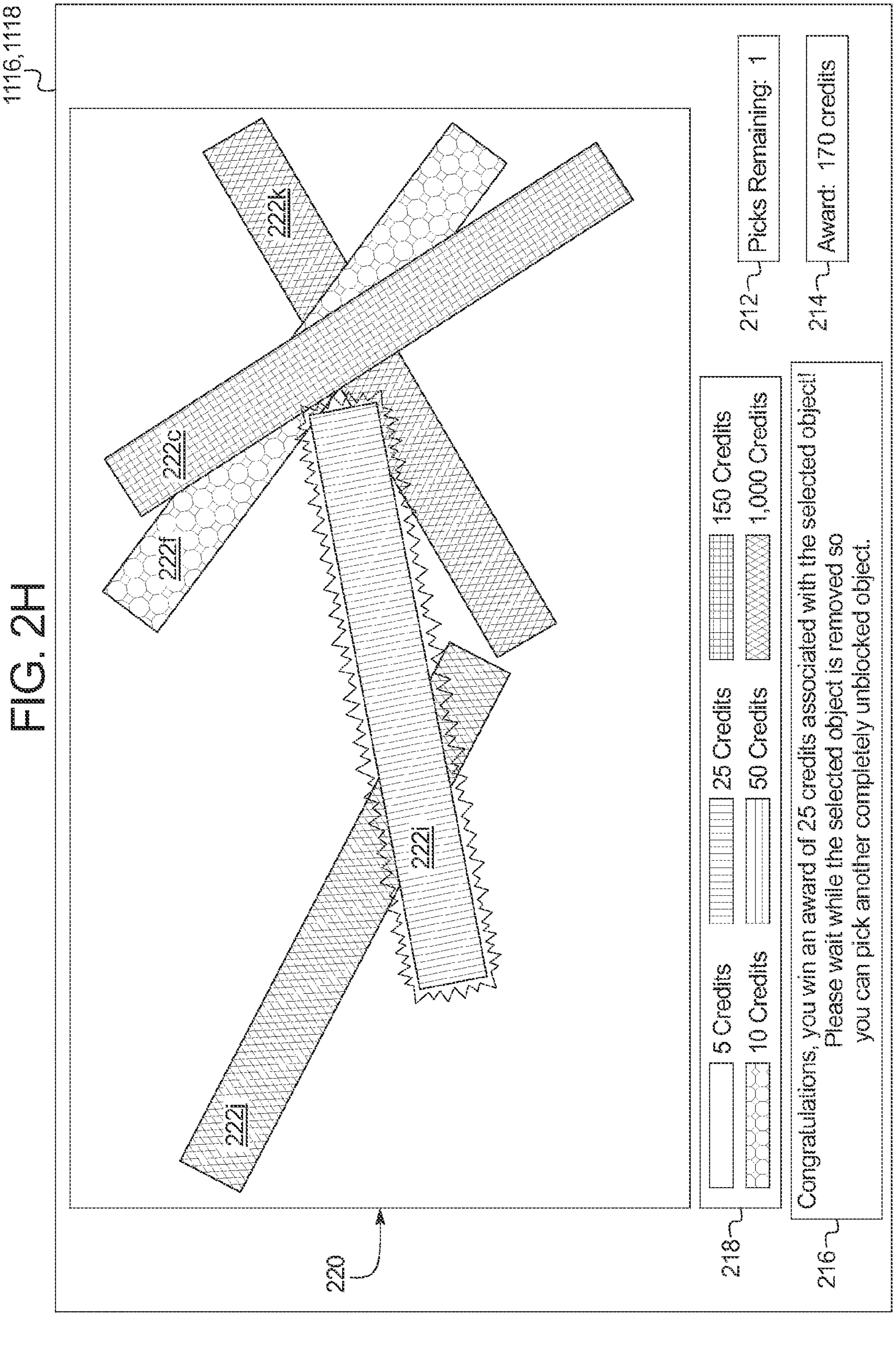

As illustrated in FIG. 2G, the gaming system removed object 222*g* from object display area 220 such that: (i) object 222*g* is no longer displayed in object display area 220; and (ii) portions of objects 222*h*, 222*i*, 222*j*, and 222*k* that were visually blocked by object 222*g* were revealed. The gaming system receives a selection of object 222*h* from the player. The gaming system reduces the player’s quantity of picks by one (from three to two) and updates picks remaining display 212 accordingly. The gaming system provides the player the 50 credit award associated with object 222*h* and updates award display 214 to reflect the 50 credit award (i.e., increases the player’s award from 95 credits to 145 credits). The gaming system removes object 222*h* from object display area 220 such that: (i) object 222*h* is no longer displayed in object display area 220 (as shown in FIG. 2H); and (ii) portions of objects 222*i*, 222*j*, and 222*k* that are visually blocked by object 222*h* are revealed (as shown in FIG. 2H). The gaming system then enables the player to use another one of the player’s picks to select one of the objects that is not visually blocked by any of the other objects. That is, at this point in time, the gaming system enables the player to select one of objects 222*c* and 222*i*. The gaming system displays the following message in message box 216: "CONGRATULATIONS, YOU WIN AN AWARD OF 50 CREDITS ASSOCIATED WITH THE SELECTED OBJECT!PLEASE WAIT WHILE THE SELECTED OBJECT IS REMOVED SO YOU CAN PICK ANOTHER COMPLETELY UNBLOCKED OBJECT!"

Figure 2I:
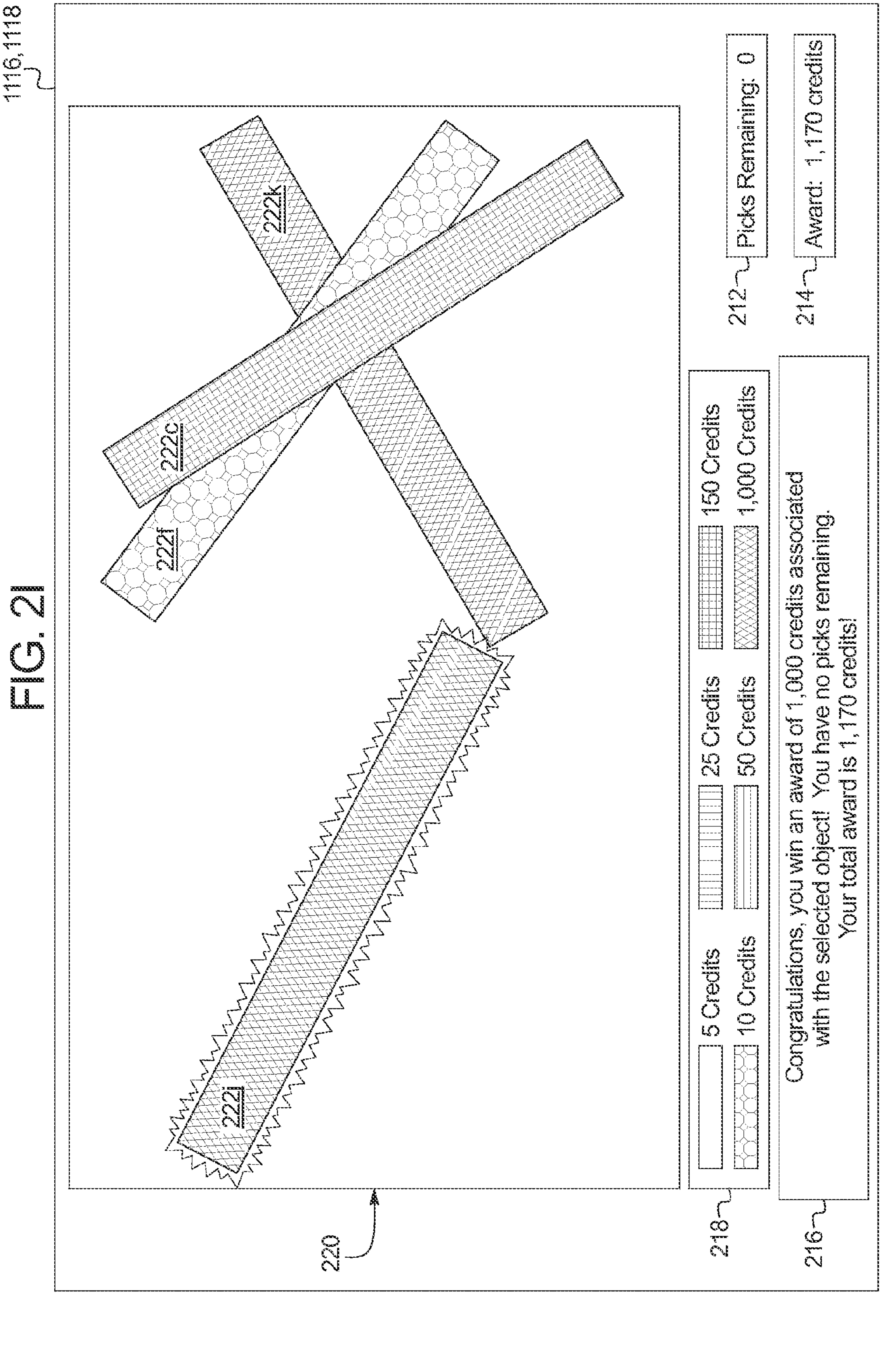

As illustrated in FIG. 2H, the gaming system removed object 222*h* from object display area 220 such that: (i) object 222*h* is no longer displayed in object display area 220; and (ii) portions of objects 222*i*, 222*j*, and 222*k* that were visually blocked by object 222*h* were revealed. The gaming system receives a selection of object 222*i* from the player. The gaming system reduces the player's quantity of picks by one (from two to one) and updates picks remaining display 212 accordingly. The gaming system provides the player the 25 credit award associated with object 222*i* and updates award display 214 to reflect the 25 credit award (i.e., increases the player's award from 145 credits to 170 credits). The gaming system removes object 222*i* from object display area 220 such that: (i) object 222*i* is no longer displayed in object display area 220 (as shown in FIG. 2I); and (ii) portions of objects 222*f*, 222*j*, and 222*k* that are visually blocked by object 222*i* are revealed (as shown in FIG. 2I). The gaming system then enables the player to use another one of the player's picks to select one of the objects that is not visually blocked by any of the other objects. That is, at this point in time, the gaming system enables the player to select one of objects 222*c* and 222*j*. The gaming system displays the following message in message box 216: "CONGRATULATIONS, YOU WIN AN AWARD OF 25 CREDITS ASSOCIATED WITH THE SELECTED OBJECT!PLEASE WAIT WHILE THE SELECTED OBJECT IS REMOVED SO YOU CAN PICK ANOTHER COMPLETELY UNBLOCKED OBJECT!"

As illustrated in FIG. 2I, the gaming system removed object 222*i* from object display area 220 such that: (i) object 222*i* is no longer displayed in object display area 220; and (ii) portions of objects 222*f*, 222*j*, and 222*k* that are visually blocked by object 222*i* were revealed. The gaming system receives a selection of object 222*j* from the player. The gaming system reduces the player's quantity of picks by one (from one to zero) and updates picks remaining display 212 accordingly. The gaming system provides the player the 1,000 credit award associated with object 222*j* and updates award display 214 to reflect the 1,000 credit award (i.e., increases the player's award from 170 credits to 1,170 credits). The gaming system removes object 222*i* from object display area 220 such that object 222*i* is no longer displayed in object display area 220 (not shown). Since object 222*i* does not visually block any portions of remaining objects 222*c*, 222*f*, and 222*k*, the gaming system does not reveal any additional portions of those objects. Since the player does not have at least a designated quantity of one pick remaining, the gaming system ends the play of the selection game. The gaming system displays the following message in message box 216: "CONGRATULATIONS, YOU WIN AN AWARD OF 1,000 CREDITS ASSOCIATED WITH THE SELECTED OBJECT!YOU HAVE NO PICKS REMAINING. YOUR TOTAL AWARD IS 1,180 CREDITS!"

It should be appreciated that the objects may have or be associated with any suitable visual characteristics such as, but not limited to: (a) patterns (as described above); (b) colors (e.g., orange, blue, red, white, black, green, or gold); (c) textures (e.g., rocky, glassy, or soft); (d) opacities (e.g., 100% opaque, 75% opaque, 50% opaque, or 25% opaque); (e) shapes (e.g., squares, rectangles, circles, ovals, or triangles); (f) images (e.g., lions, tigers, or bears); (g) numbers; (h) letters; (i) words; (j) playing cards; and/or (k) symbols.

It should also be appreciated that the objects may be associated with any suitable types of awards and, in embodiments in which the objects' visual characteristics determine the awards with which those objects are associated, the visual characteristics may be associated with any suitable types of awards. For example, each object (or each visual characteristic) may be associated with one or more of the following awards: (a) monetary credits or currency (as in the example described above with respect to FIGS. 2A to 2I); (b) non-monetary credits or currency; (c) a multiplier for use in the current play of the selection game, one or more future plays of the selection game, and/or one or more future plays of the base game; (d) one or more free plays of the base game (such as one or more free spins when the base game is a spinning reel type game) or the selection game; (e) one or more plays of one or more bonus games other than the selection game (such as a free spin of an award wheel); (f) one or more lottery based awards, such as lottery or drawing tickets; (g) a wager match for one or more plays of the base game; (h) an increase in the average expected payback percentage of the selection game and/or the base game for one or more plays of those games; (i) one or more comps, such as a free dinner, a free night's stay at a hotel, a high value product such as a free car, or a low value product such as a free teddy bear; (j) one or more bonus or promotional credits usable for online play; (k) a lump sum of player tracking points or credits; (l) a multiplier for player tracking points or credits; (m) an increase in a membership or player tracking level; (n) coupons or promotions usable within the gaming establishment and/or outside of the gaming establishment (e.g., a 20% off coupon for use at a convenience store or a promotional code providing a deposit match for use in association with an online casino); (o) an access code usable to unlock content on the internet; (p) an additional quantity of picks (e.g., an "Add 2 Picks" award that causes the gaming system to increase the player's quantity of picks by two); (q) a "Collect All" award that causes the gaming system to automatically select one of: (1) all of the remaining objects for the player, (2) all of the remaining objects of a single color for the player, and (3) all of the remaining objects of two or more particular colors for the player; (r) a "Re-Shuffle" award that causes the gaming system to remove the objects from the object display area and re-display those objects scattered throughout the object display area in a different manner; (s) an "Upgrade" award that causes the gaming system to increase the award associated with at least one of the objects displayed in the object display area (such as any completely unblocked objects); (t) a "Next Level" award that starts a new play of the selection game including different objects and/or awards or the same objects and/or awards; (u) an automatic pick of one or more of the remaining objects without reducing the player's quantity of picks; (v) an ability to view "behind" or "under" an object; (w) an "Add Objects" award that causes the gaming system to add one or more additional objects to the object display area; and (x) an ability to view the awards associated with one or more of the objects in the object display area.

In various embodiments, the gaming system provides an award (such as any of the awards listed above) when a designated combination of objects has been selected. In one example, the gaming system provides an award when all of the objects having a designated visual characteristic (such as a designated color) have been selected. In another example, the gaming system provides an award when objects having complementary visual characteristics (such as complementary colors or two different halves of a symbol) have been selected. In another example, the gaming system provides an award when objects that are playing cards are selected such that the selected playing cards form a winning poker hand. In another example, the gaming system provides an award when objects that include symbols are selected such that the symbols of the selected objects form a winning symbol combination. It should be appreciated that the gaming system may provide an award when any suitable combination of the objects has been selected.

In certain embodiments, the awards associated with the objects (or the visual characteristics) are predetermined. In other embodiments, the awards associated with the objects (or the visual characteristics) are: (a) randomly determined; (b) determined based on game play (e.g., on play of the base game); (c) determined based on which of a plurality of bonus game triggering events occur to trigger the play of the selection game; (d) determined based on coin-in and/or coin-out; (e) determined based on the denomination of the gaming system; (f) determined based on time; (g) determined based on the player's total wager; (h) determined based on the quantity of paylines wagered on; (i) determined based on the redemption of non-monetary credits such as promotional credits; (j) determined based on the redemption of bonusing points or credits; (k) determined based on a sequence in which the objects are selected (e.g., objects selected in a certain sequence are associated with greater awards than if those objects are selected in a different sequence); and/or (l) determined in any other suitable manner(s) or based on any other suitable factor(s).

In certain embodiments, the gaming system displays an indication of the award associated with each object on the object itself when the object is displayed in the object display area. For instance, if one of the objects displayed in the object display area is associated with an award of 100 credits, the gaming system displays an indication of "100 credits" somewhere on that object. It should be appreciated, however, that all or part of that displayed indication of the award may be visually blocked by one or more of the other objects.

In various embodiments, the objects (or the visual characteristics) are associated with award ranges rather than specific awards. In one such embodiment, the selection game is associated with a plurality of tiers of award ranges associated with increasing award amounts. It should be appreciated that, in these embodiments, when the gaming system receives a selection of one of the objects from the player, the gaming system determines the award to provide to the player from the award range associated with the selected object in any suitable manner, such as randomly or based on a predetermined order.

In one example, the selection game is associated with the following tiers of award ranges (and their corresponding visual characteristics): a Bronze award range of 10 credits to 100 credits that is associated with the color bronze, a Silver award range of 200 credits to 500 credits that is associated with the color silver, a Gold award range of 750 credits to 1500 credits that is associated with the color gold, and a Diamond award range of 2000 credits to 5000 credits that is associated with a diamond image. In this example, each object has or is associated with the color bronze, the color silver, the color gold, or the diamond image. When the gaming system receives a selection of one of the objects from the player, the gaming system randomly determines an award to provide to the player from the award range associated with the visual characteristic (i.e., the color bronze, silver, or gold or the diamond image) of the selected object.

In various embodiments, each of the objects has a selection cost of one or a plurality of picks. In these embodiments, the selection cost of a given object represents the quantity of picks the player must use to select that object to cause the gaming system to: (a) provide the award associated with that object, and (b) remove that object from the object display area such that: (i) that object is no longer displayed in the object display area; and (ii) any non-displayed portions of at least one of the objects visually blocked by that object, if any, are revealed. It should be appreciated that any suitable quantity of the objects may be associated with any suitable selection cost. For instance, certain objects are associated with a selection cost of one pick, other objects associated with relatively higher awards are associated with a selection cost of two picks, and still other objects associated with the highest awards are associated with a selection cost of three picks. In certain such embodiments, the gaming system visually indicates how many times a given object having a selection cost greater than one has been selected by, for example, displaying signs of decay (e.g., cobwebs accumulating or bricks cracking) or growth (e.g., flowers growing, a sunrise occurring) in association with that object.

In another embodiment, the gaming system does not provide the player the awards associated with the selected objects. Rather, in this embodiment, the gaming system populates different slices of an award wheel with the awards associated with the selected objects. After the player's quantity of picks runs out, the gaming system enables the player to spin the award wheel. The gaming system provides the player the award (which is the award associated with one of the selected objects) associated with a determined outcome of the spin.

In one embodiment, each object is either a blocking object or an award object. In this embodiment, the award objects are associated with awards and the blocking objects are not associated with awards. In this embodiment, the gaming system enables the player to use the player's picks to select blocking objects that are not visually blocked by any of the other objects. The gaming system automatically provides the player the awards associated with any award blocks that are not visually blocked by any of the other objects. That is, in this embodiment, the gaming system does not require the player to pick the award blocks to earn the awards associated with the award blocks. For example, if an award block is visually blocked by two blocking objects, the player must use the player's picks to select the two blocking objects, thereby unblocking the award block and causing the gaming system to provide the award associated with that now unblocked award block to the player.

In one embodiment, the gaming system enables the player to use one of the player's picks (or, in other embodiments, monetary credits, non-monetary credits, or player tracking points or credits) to "peek behind" certain objects that are visually blocking one or more of the other objects. For instance, the gaming system enables the player to exchange a designated quantity of at least one pick to view the object display area with one of the objects temporarily removed. This enables the player to "peek behind" that object, which provides the player additional information regarding the stacking and orientation of the objects and enables the player to better strategize how to make future object selections to maximize the player's award or to provide the player a better chance of eventually selecting a desired one of the objects.

In another embodiment, a first one of the objects is "attached to" or otherwise associated with a second one of the objects. When the gaming system receives a selection of the first one of the objects or the second one of the objects, the gaming system: (a) provides the awards associated with the first one of the objects and the second one of the objects, and (b) removes the first one of the objects and the second one of the objects from the object display area such that: (i) the first one of the objects and the second one of the objects are no longer displayed in the object display area; and (ii) any non-displayed portions of at least one of the objects visually blocked by the first one of the objects and/or the second one of the objects, if any, are revealed. In another embodiment, when the gaming system receives a selection of the first one of the objects or the second one of the objects, the gaming system (a) provides the award associated with the first one of the objects and not the award associated with the second one of the objects, and (b) removes the first one of the objects and the second one of the objects from the object display area such that: (i) the first one of the objects and the second one of the objects are no longer displayed in the object display area; and (ii) any non-displayed portions of at least one of the objects visually blocked by the first one of the objects and/or the second one of the objects, if any, are revealed.

In certain embodiments, at least one of the objects is associated with a selection game terminator instead of or in addition to an award. In these embodiments, when the gaming system receives a selection from the player of the object associated with the selection game terminator, the gaming system provides any award associated with the selected object and terminates the play of the selection game, regardless of how many picks the player has remaining. In one such embodiment, the gaming system provides a consolation award to the player when the gaming system receives a selection from the player of an object associated with the selection game terminator. In one instance, the consolation award is a predetermined award. In another instance, the consolation award is provided only if the player did not accumulate a designated award amount during the play of the selection game. In a further instance, the gaming system determines the consolation award based on any awards accumulated by the player during the play of the selection game (e.g., the better the player did during play of the selection game, the smaller or less valuable the consolation award).

In certain embodiments in which the award associated with at least one of the objects is a free play of a base game or a bonus game, such as a designated quantity of free spins of a spinning reel type game, the gaming system determines the average expected payback percentage for the free play(s) based on the awards the player won during the play of the selection game. In one example, the worse the player performed during the play of the selection game, the higher the average expected payback percentage of the free play(s).

In certain embodiments, the gaming system compensates for poor player object selection by providing the player one or more advantages during the selection game. In one such embodiment, the gaming system compensates for poor player selection by enabling the player to select again, such as by providing the player with one or more additional picks, or by automatically selecting an optimal object. In another embodiment, the gaming system compensates for poor player selection by providing one or more easily-accessible “mystery” objects that are not associated with predetermined awards. In this embodiment, when the gaming system receives a selection from the player of one of these “mystery” objects, the gaming system determines the award to provide to the player based on how well (or how poorly) the player has performed during the play of the selection game. For instance, the gaming system will determine a relatively high award for a player who is performing poorly when the player selects one of the “mystery” objects.

In certain embodiments, the gaming system visually indicates which of the objects are selectable. That is, in these embodiments, the gaming system visually indicates which of the objects are not visually blocked by any of the other objects. The gaming system may do so in any suitable manner, such as by highlighting, outlining, or flashing such objects.

In one embodiment in which the objects are playing cards, each individual object (i.e., playing card) is not associated with an award. In this embodiment, the gaming system provides the player at least five picks and, after the player makes the player’s selections, determines a best five-card poker hand from the selected objects (i.e., the selected playing cards). The gaming system determines an award by comparing the best five-card poker hand to a paytable. Thus, in this embodiment, the player must select objects (i.e., playing cards) in an attempt to create a best-ranking five-card poker hand.

In one embodiment, the gaming system provides another play of the selection game upon an occurrence of a new play triggering event. In one example, the new play triggering event occurs when the player has selected all of the objects. In another example, the new play triggering event occurs when none of the objects are selectable (i.e., when all of the objects are at least partially visually blocked by the other object(s)).

In certain embodiments, for a given player, the selection game persists from play of the selection game to play of the selection game and from gaming session to gaming session until either the player selects all of the objects. For instance, if a player terminates a gaming session when the selection game includes six objects, the next time the player initiates a gaming session and triggers the selection game, the selection game will include those six objects. In one example, the gaming system stores the state of the selection game upon termination of a gaming session in association with the player’s player tracking information. In other embodiments, for a given player, the selection game persists from play of the selection game to play of the selection game but not from gaming session to gaming session.

In an alternative embodiment, the gaming system enables the player to select any of the objects displayed in the object display area, regardless of whether any portions of those objects are visually blocked by any of the other objects. Although, in this embodiment, the gaming system enables the player to select visually blocked objects, the player takes a chance in doing so because all of the information associated with those visually blocked objects may not be available to the player. In one example, the gaming system displays an indication of the award associated with each of the objects on the objects themselves. In this example, certain of visually blocked objects may have part or all of their award indications blocked by one or more other objects. If the player desires to select one of those objects, then the player must do so without knowing for certain the award associated with that object (without first selecting the object(s) visually blocking the indication of the award).

While the embodiments described above are directed to a single player selection game, the present disclosure contemplates providing the selection game as a multiplayer, group, or community selection game played by a plurality of players. In certain embodiments, the gaming system enables players to sequentially use their picks to select objects and win their associated awards, as described above. In one embodiment, the community selection game is played by one or more human players and one or more virtual or gaming system controlled player.

In another alternative embodiment, each of the objects is associated with an award in the form of a game. In this embodiment, when the gaming system receives a selection of one of the objects from the player, the gaming system provides one or more plays of the game associated with the selected object to the player. If the player achieves a designated outcome or one of a plurality of designated outcomes for the play of the game, the gaming system: (a) provides an award to the player, and (b) removes the selected object from the object display area such that: (i) the selected object is no longer displayed in the object display area, and (ii) a non-displayed portion of at least one of the objects visually blocked by the selected object, if any, is revealed. If not, the gaming system does not remove the selected object from the object display area. It should be appreciated that the game may be any suitable game, such as a slot game, a card game, a selection game, a wheel game, a puzzle game, or a skill game.

It should be appreciated that the above-described embodiment is merely one manner in which the selection game of the present disclosure may be presented. In an alternative embodiment, the objects are path segments. In this embodiment, the gaming system enables the player to pick the path segments to create a path from a starting point to one or more awards, and provides any awards associated with the completed path.

In another alternative embodiment, the gaming system displays a plurality of selections, each of which is associated with an award. Certain of the selections are associated with prerequisites that must be satisfied before those selections may be selected. Tables 1 and 2 below illustrate an example. As shown in Table 1, selections A, B, and C are immediately available; that is, these selections have no prerequisites and may be selected at any time. Selection D has a prerequisite that selection A be selected before selection D may be selected. Selection E has a prerequisite that selection D be selected before selection E may be selected. Selections F and J have a prerequisite that selection I be selected before selections F and J may be selected. Selection G has a prerequisite that selections B and D be selected before selection G may be selected. Selection H has a prerequisite that selections E and G be selected before selection H may be selected. Selection I has a prerequisite that selection H be selected before selection I may be selected. Selection J has a prerequisite that selection I be selected before selection J may be selected. Selection K has a prerequisite that selection F be selected before selection K may be selected.

TABLE 1

Set of Example Selections and Associated Prerequisites and Awards

| Selection A | Selection B | Selection C | Selection D |
|---|---|---|---|
| Available Now 5 credits | Available Now 10 credits | Available Now 150 credits | Requires Selection A 5 credits |
| **Selection E** | **Selection F** | **Selection G** | **Selection H** |
| Requires Selection D 50 credits | Requires Selection I 10 credits | Requires Selections B and D 25 credits | Requires Selections E and G 50 credits |
| **Selection I** | **Selection J** | **Selection K** | |
| Requires Selection H 25 credits | Requires Selection I 1,000 credits | Requires Selection F 1,000 credits | Total award: 0 |

Table 2 illustrates how the prerequisites change after selections A and D are selected.

TABLE 2

Set of Example Selections After Selections A and D Selected

| | Selection B | Selection C | |
|---|---|---|---|
| | Available Now 10 credits | Available Now 150 credits | |
| **Selection E** | **Selection F** | **Selection G** | **Selection H** |
| Available Now 50 credits | Requires Selection I 10 credits | Requires Selection B 25 credits | Requires Selections E and G 50 credits |
| **Selection I** | **Selection J** | **Selection K** | |
| Requires Selection H 25 credits | Requires Selection I 1,000 credits | Requires Selection F 1,000 credits | Total award: 10 |

In certain embodiments, the gaming system displays a plurality of object display areas. In these embodiments, upon initiation of a play of the selection game, the gaming system displays a plurality of objects in each of the object display areas (as described above) and provides the player a quantity of picks. The gaming system enables the player to use the player's picks to select objects displayed in the object display areas (as described above). In one such embodiment, the gaming system requires the player to sequentially pick objects from the different object display areas. For instance, the gaming system requires the player to select an object in a first object display area, then an object from a second object display area, then an object from a third object display area, then an object from the first object display area, and so on. In another such embodiment, the gaming system enables the player to select objects regardless of in which object display areas they are displayed. In another such embodiment, the gaming system requires the player to select corresponding (such as matching) objects in different object display areas for those objects to be removed. For instance, the gaming system displays objects in two object display areas, and the gaming system removes objects from the object display areas when the player selects objects that share the same visual characteristic displayed in each object display area.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
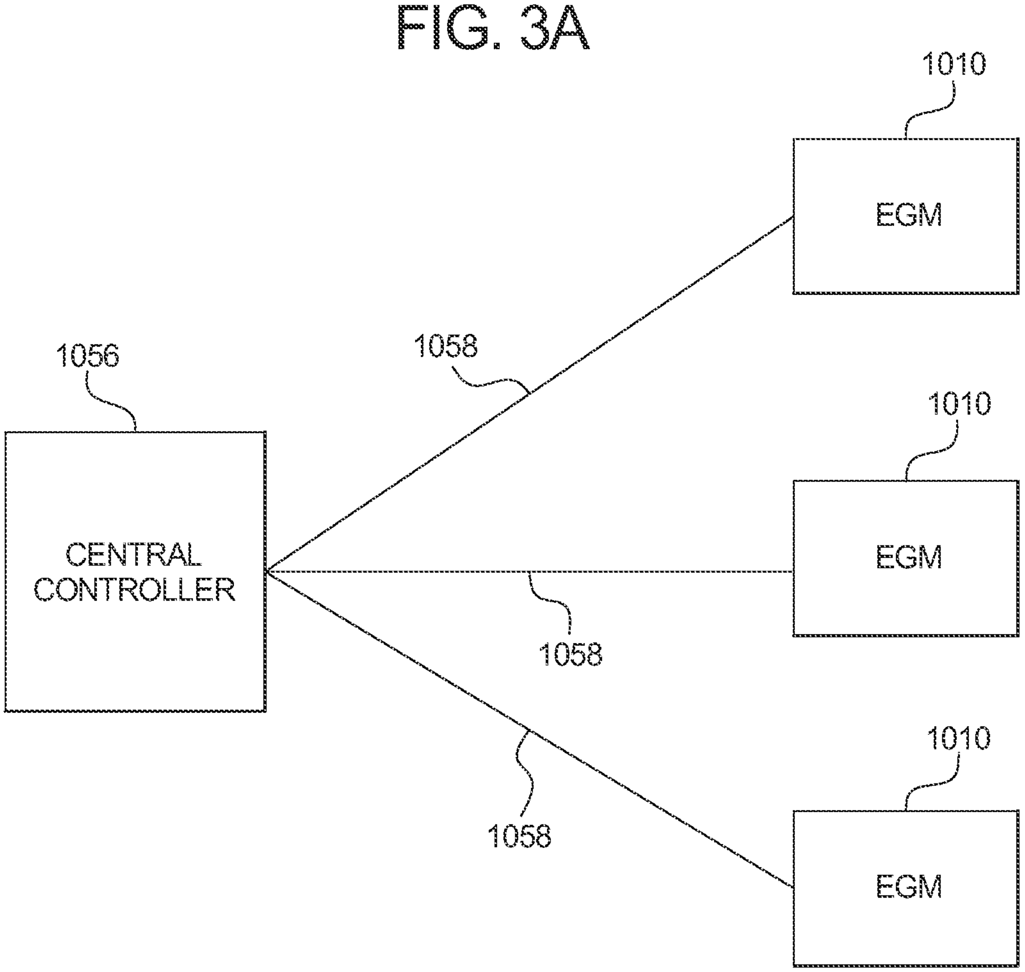
FIG. 3A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
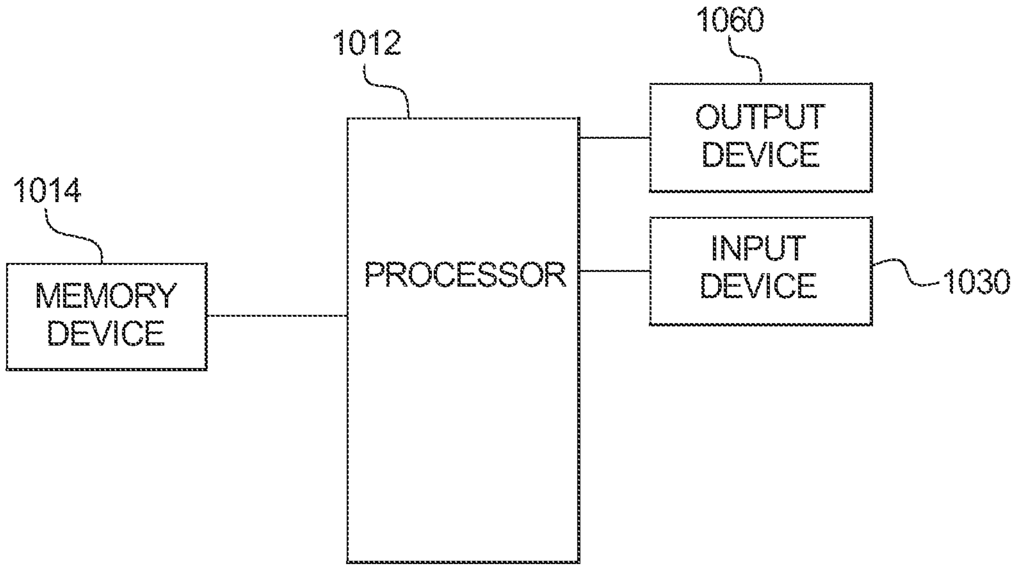
FIG. 3B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
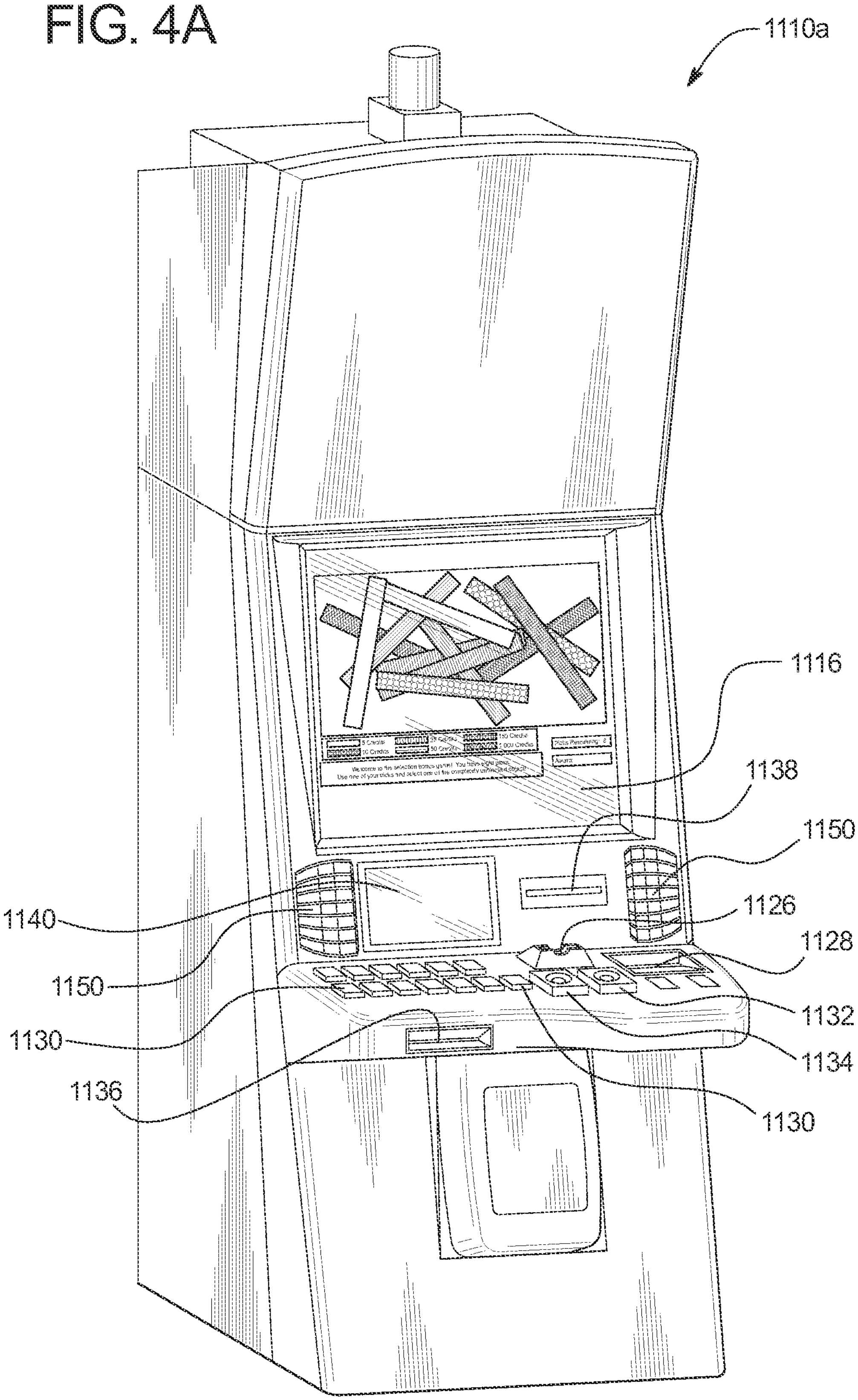
FIGS. 4A and 4B are perspective views of example alternative embodiments of the gaming system of the present disclosure.
Figure 4B:
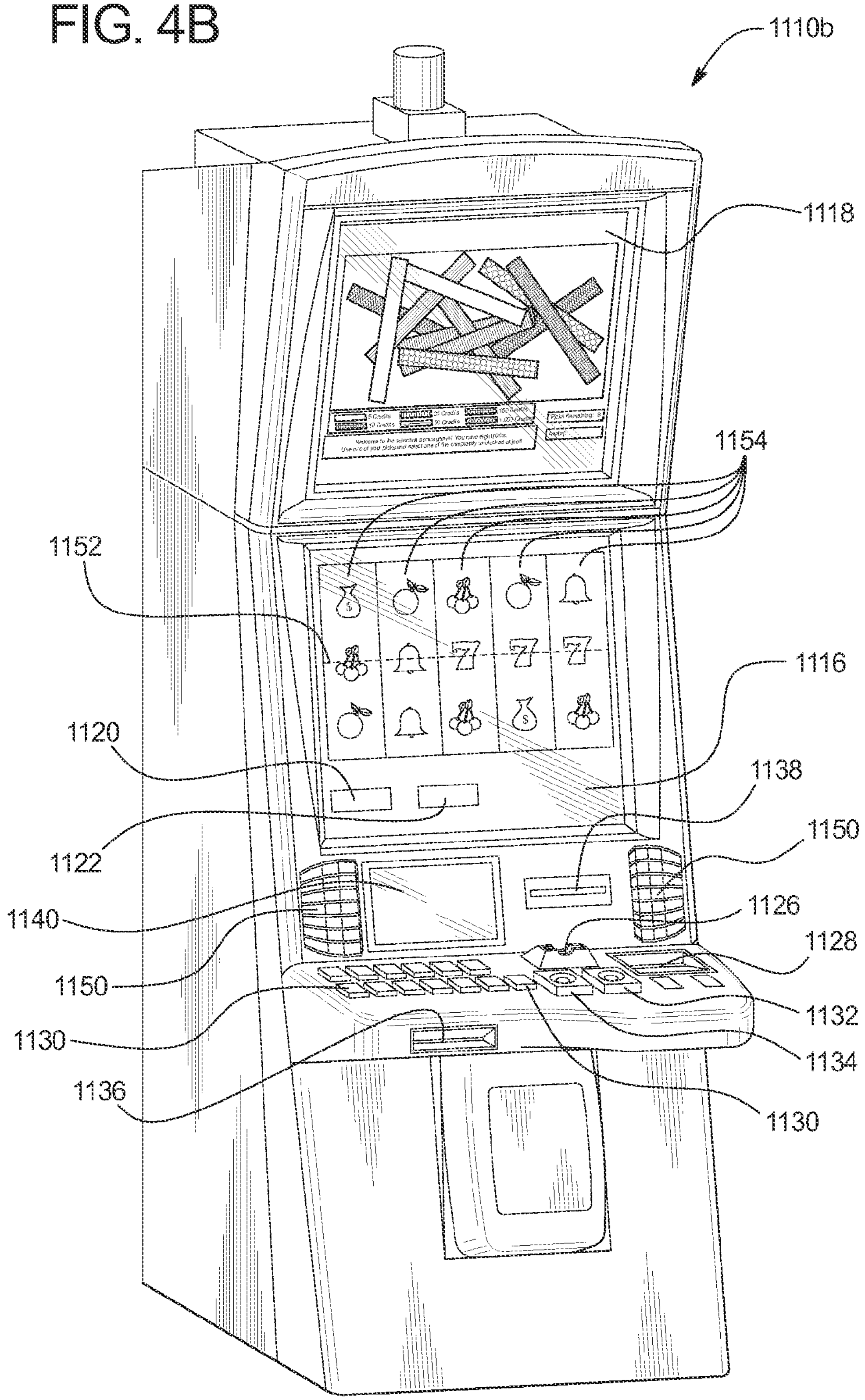

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 1132. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 3A includes a central display device 1116, a player tracking display 1140, a credit display 1120, and a bet display 1122. The example EGM illustrated in FIG. 3B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 20061/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955, 170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIG. 4B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A gaming system comprising:

at least one processor;

at least one display device;

at least one input device; and at least one memory device storing a plurality of instructions which, when executed by the at least one processor, cause the at least one processor to operate with the at least one display device and the at least one input device, for a play of a selection game, to:

(a) provide a player a quantity of one or more picks;

(b) display a plurality of objects in an object display area such that at least a portion of each of one or more of the objects is visually blocked by at least one of the other objects and one or more of the objects are not visually blocked by any of the other objects;

(c) enable the player to select one of the objects that are not visually blocked by any of the other objects and do not enable the player to select any of the objects that are visually blocked by one or more of the other objects;

(d) receive a selection of one of the objects that are not visually blocked by any of the other objects;

(e) reduce the player's quantity of picks;

(f) provide any award associated with the selected object;

(g) remove the selected object from the object display area such that:

(i) the selected object is no longer displayed in the object display area; and (ii) a non-displayed portion of at least one of the objects visually blocked by the selected object, if any, is revealed; and (h) repeat (c) to (h) if the player has at least a designated quantity of picks remaining.

2. The gaming system of claim 1, wherein each of the objects has one of a plurality of different visual characteristics.

3. The gaming system of claim 2, wherein each of the visual characteristics is associated with one of a plurality of different awards and the award associated with the selected object is the award associated with the visual characteristic of the selected object.

4. The gaming system of claim 2, wherein each of the visual characteristics is associated with one of a plurality of different ranges of award values, and the plurality of instructions, when executed by the at least one processor, cause the at least one processor to determine the award associated with the selected object from the range of award values associated with the visual characteristic of the selected object.

5. The gaming system of claim 2, wherein the plurality of instructions, when executed by the at least one processor, cause the at least one processor to, when each of the objects associated with a designated one of the visual characteristics has been selected, provide an additional award.

6. The gaming system of claim 1, wherein at at least one point in time during said play of the selection game, least two of the objects are not visually blocked by any of the other objects.

7. The gaming system of claim 1, wherein if the selected object is a designated object, the plurality of instructions, when executed by the at least one processor, cause the at least one processor to remove an additional one of the objects from the object display area such that:

(i) the additional one of the objects is no longer displayed in the object display area; and (ii) a non-displayed portion of at least one of the objects visually blocked by the additional one of the objects, if any, is revealed.

8. The gaming system of claim 1, wherein at any point in time during said play of the selection game, at least one of the objects is not visually blocked by any of the other objects.

9. The gaming system of claim 1, wherein the plurality of instructions, when executed by the at least one processor, cause the at least one processor to, if the selected object is a designated object, terminate said play of the selection game.

10. The gaming system of claim 9, wherein the plurality of instructions, when executed by the at least one processor, cause the at least one processor to provide a consolation award if the selected object is the designated object.

11. The gaming system of claim 1, wherein the plurality of instructions, when executed by the at least one processor, cause the at least one processor to, if the selected object is a designated object, provide a play of a game and provide (g)(i) to (g)(ii) if an outcome of the play of the game is a designated outcome.

12. A method of operating a gaming system, said method comprising:

for a play of a selection game:

(a) providing a player a quantity of one or more picks;

(b) causing at least one processor to execute a plurality of instructions stored in at least one memory device to operate with at least one display device to display a plurality of objects in an object display area such that at least a portion of each of one or more of the objects is visually blocked by at least one of the other objects and one or more of the objects are not visually blocked by any of the other objects;

(c) enabling the player to select one of the objects that are not visually blocked by any of the other objects and do not enable the player to select any of the objects that are visually blocked by one or more of the other objects;

(d) receiving a selection of one of the objects that are not visually blocked by any of the other objects;

(e) causing the at least one processor to execute the plurality of instructions to reduce the player's quantity of picks;

(f) providing any award associated with the selected object;

(g) causing the at least one processor to execute the plurality of instructions to operate with the at least one display device to remove the selected object from the object display area such that:

(i) the selected object is no longer displayed in the object display area; and (ii) a non-displayed portion of at least one of the objects visually blocked by the selected object, if any, is revealed; and (h) repeating (c) to (h) if the player has at least a designated quantity of picks remaining.

13. The method of claim 12, wherein each of the objects has one of a plurality of different visual characteristics.

14. The method of claim 13, wherein each of the visual characteristics is associated with one of a plurality of different awards and the award associated with the selected object is the award associated with the visual characteristic of the selected object.

15. The method of claim 13, wherein each of the visual characteristics is associated with one of a plurality of different ranges of award values, and which includes causing the at least one processor to execute the plurality of instructions to determine the award associated with the selected object from the range of award values associated with the visual characteristic of the selected object.

16. The method of claim 13, which includes, when each of the objects associated with a designated one of the visual characteristics has been selected, providing an additional award.

17. The method of claim 12, wherein at at least one point in time during said play of the selection game, least two of the objects are not visually blocked by any of the other objects.

18. The method of claim 12, which includes causing the at least one processor to execute the plurality of instructions to operate with the at least one display device to operate with the at least one display device to, if the selected object is a designated object, remove an additional one of the objects from the object display area such that:

(i) the additional one of the objects is no longer displayed in the object display area; and (ii) a non-displayed portion of at least one of the objects visually blocked by the additional one of the objects, if any, is revealed.

19. The method of claim 12, wherein at any point in time during said play of the selection game, at least one of the objects is not visually blocked by any of the other objects.

20. The method of claim 12, which includes causing the at least one processor to execute the plurality of instructions to, if the selected object is a designated object, terminate said play of the selection game.

21. The method of claim 20, which includes providing a consolation award if the selected object is the designated object.

22. The method of claim 12, which includes, if the selected object is a designated object, providing a play of a game and providing (g)(i) to (g)(ii) if an outcome of the play of the game is a designated outcome.

23. The method of claim 12, which is provided through a data network.

24. The method of claim 23, wherein the data network is an internet.

25. A non-transitory computer readable medium storing a plurality of instructions which, when executed by at least one processor, cause the at least one processor to:

for a play of a selection game:

(a) provide a player a quantity of one or more picks;

(b) cause at least one display device to display a plurality of objects in an object display area such that at least a portion of each of one or more of the objects is visually blocked by at least one of the other objects and one or more of the objects are not visually blocked by any of the other objects;

(c) enable the player to select one of the objects that are not visually blocked by any of the other objects and do not enable the player to select any of the objects that are visually blocked by one or more of the other objects;

(d) receive a selection of one of the objects that are not visually blocked by any of the other objects;

(e) reduce the player's quantity of picks;

(f) provide any award associated with the selected object;

(g) remove the selected object from the object display area such that:

(i) the selected object is no longer displayed in the object display area; and (ii) a non-displayed portion of at least one of the objects visually blocked by the selected object, if any, is revealed; and (h) repeat (c) to (h) if the player has at least a designated quantity of picks remaining.

26. The non-transitory computer readable medium of claim 25, wherein each of the objects has one of a plurality of different visual characteristics.

27. The non-transitory computer readable medium of claim 26, wherein each of the visual characteristics is associated with one of a plurality of different awards and the award associated with the selected object is the award associated with the visual characteristic of the selected object.

28. The non-transitory computer readable medium of claim 26, wherein each of the visual characteristics is associated with one of a plurality of different ranges of award values, and the plurality of instructions, when executed by the at least one processor, cause the at least one processor to determine the award associated with the selected object from the range of award values associated with the visual characteristic of the selected object.

29. The non-transitory computer readable medium of claim 26, wherein the plurality of instructions, when executed by the at least one processor, cause the at least one processor to, when each of the objects associated with a designated one of the visual characteristics has been selected, provide an additional award.

30. The non-transitory computer readable medium of claim 25, wherein at at least one point in time during said play of the selection game, least two of the objects are not visually blocked by any of the other objects.

31. The non-transitory computer readable medium of claim 25, wherein if the selected object is a designated object, the plurality of instructions, when executed by the at least one processor, cause the at least one processor to remove an additional one of the objects from the object display area such that:

(i) the additional one of the objects is no longer displayed in the object display area; and (ii) a non-displayed portion of at least one of the objects visually blocked by the additional one of the objects, if any, is revealed.

32. The non-transitory computer readable medium of claim 25, wherein at any point in time during said play of the selection game, at least one of the objects is not visually blocked by any of the other objects.

33. The non-transitory computer readable medium of claim 25, wherein the plurality of instructions, when executed by the at least one processor, cause the at least one processor to, if the selected object is a designated object, terminate said play of the selection game.

34. The non-transitory computer readable medium of claim 33, wherein the plurality of instructions, when executed by the at least one processor, cause the at least one processor to provide a consolation award if the selected object is the designated object.

35. The non-transitory computer readable medium of claim 25, wherein the plurality of instructions, when executed by the at least one processor, cause the at least one processor to, if the selected object is a designated object, provide a play of a game and provide (g)(i) to (g)(ii) if an outcome of the play of the game is a designated outcome.

* * * * *